US012175055B2

(12) United States Patent
Moriura et al.

(10) Patent No.: US 12,175,055 B2
(45) Date of Patent: Dec. 24, 2024

(54) DISPLAY METHOD, SAMPLE ANALYZER, AND RECORDING MEDIUM

(71) Applicant: SYSMEX CORPORATION, Kobe (JP)

(72) Inventors: Kazuma Moriura, Kobe (JP); Hiroshi Kurono, Kobe (JP); Akihito Kato, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 16/583,311

(22) Filed: Sep. 26, 2019

(65) Prior Publication Data

US 2020/0104031 A1    Apr. 2, 2020

(30) Foreign Application Priority Data

Sep. 28, 2018  (JP) ................................. 2018-186074

(51) Int. Cl.
*G06F 17/00* (2019.01)
*G01N 35/00* (2006.01)
(Continued)

(52) U.S. Cl.
CPC ... *G06F 3/04817* (2013.01); *G01N 35/00722* (2013.01); *G06F 3/0482* (2013.01); *G06F 3/0484* (2013.01); *G01N 2035/0091* (2013.01)

(58) Field of Classification Search
CPC .. G06F 3/04817; G06F 3/0482; G06F 3/0484; G01N 35/00722; G01N 2035/0091; G01N 35/00732; G01N 35/025; G01N 2035/00851; G01N 2035/00811; G01N 35/00663; G01N 2035/00673; G01N 35/00584; G01N 35/00; G01N 2035/00891

See application file for complete search history.

(56) References Cited

U.S. PATENT DOCUMENTS 5,839,091 A    11/1998 Rhett et al.
8,090,402 B1 *  1/2012 Fujisaki ............... H04M 1/0266
                                                    455/410

(Continued)

FOREIGN PATENT DOCUMENTS

CN    101126762 A    2/2008
CN    101726615 A    6/2010
(Continued)

OTHER PUBLICATIONS

Extended European search report (EESR) issued on Feb. 24, 2020 in a counterpart European patent application.

(Continued)

*Primary Examiner* — Laurie A Ries
(74) *Attorney, Agent, or Firm* — METROLEX IP LAW GROUP, PLLC; Robert L. Scott, Esq.

(57) ABSTRACT

A display method according to one or more aspects may be a method used in a sample analyzer comprising holders configured to hold reagent containers of reagents used for an analysis of a sample. The display method may include: displaying, on a display unit, icons respectively associated with the holders; receiving selection of icons from the icons displayed on the display unit; and receiving an instruction for a predetermined operation relevant to the selected icons.

24 Claims, 34 Drawing Sheets

(51) Int. Cl.
*G06F 3/04817* (2022.01)
*G06F 3/0482* (2013.01)
*G06F 3/0484* (2022.01)

(56) References Cited

U.S. PATENT DOCUMENTS

| | | | | |
|---|---|---|---|---|
| 8,920,722 | B2* | 12/2014 | Kitagawa | G01N 35/025 |
| | | | | 422/63 |
| 8,961,876 | B2* | 2/2015 | Tanoshima | G01N 35/00732 |
| | | | | 422/63 |
| 9,248,451 | B2* | 2/2016 | Kondou | B01L 3/527 |
| 11,740,253 | B2* | 8/2023 | Sasaki | G01N 35/04 |
| | | | | 422/63 |
| 12,099,010 | B2* | 9/2024 | Erdei | G01N 35/00722 |
| 2003/0184600 | A1* | 10/2003 | Lin-Hendel | G06F 3/04817 |
| | | | | 715/853 |
| 2008/0063570 | A1 | 3/2008 | Fujino et al. | |
| 2008/0240991 | A1 | 10/2008 | Wakamiya et al. | |
| 2010/0114501 | A1 | 5/2010 | Kondou et al. | |
| 2010/0115463 | A1* | 5/2010 | Kondou | B01L 3/527 |
| | | | | 715/803 |
| 2013/0227490 | A1* | 8/2013 | Thorsander | G06F 3/04883 |
| | | | | 715/841 |
| 2013/0244274 | A1* | 9/2013 | Nishikawa | G01N 35/00663 |
| | | | | 435/39 |
| 2014/0119994 | A1* | 5/2014 | Ariyoshi | G01N 33/50 |
| | | | | 422/68.1 |
| 2014/0356233 | A1* | 12/2014 | Hagiwara | G01N 35/00693 |
| | | | | 422/68.1 |
| 2016/0046468 | A1* | 2/2016 | Heravi | B66D 1/54 |
| | | | | 715/835 |
| 2021/0208176 | A1* | 7/2021 | Ha | G01N 35/1002 |

FOREIGN PATENT DOCUMENTS

| | | | | |
|---|---|---|---|---|
| CN | 101126762 B * | 6/2012 | | G01N 35/00663 |
| CN | 103998939 A | 8/2014 | | |
| CN | 104024861 A | 9/2014 | | |
| CN | 104073423 A | 10/2014 | | |
| EP | 2182367 A2 | 5/2010 | | |
| EP | 2182367 A3 | 12/2017 | | |
| JP | 2006018517 A | 1/2006 | | |
| JP | 2007-93297 A | 4/2007 | | |
| JP | 2008-39471 A | 2/2008 | | |
| JP | 2008-070115 A | 3/2008 | | |
| JP | 2008-275585 A | 11/2008 | | |
| JP | 2009-036513 A | 2/2009 | | |
| JP | 2010-107433 A | 5/2010 | | |
| JP | 2010-107478 A | 5/2010 | | |
| JP | 2013-76619 A | 4/2013 | | |
| JP | 2015-230182 A | 12/2015 | | |
| JP | 2017-513023 A | 5/2017 | | |
| WO | 2013/094485 A1 | 6/2013 | | |
| WO | 2016/136435 A1 | 9/2016 | | |
| WO | 2018/051672 A1 | 3/2018 | | |

OTHER PUBLICATIONS

Japanese Office Action (JPOA) issued on Mar. 3, 2020 in a counterpart Japanese patent application.
Sysmex Corporation, "Automated Blood Coagulation Analyzer CS-5100 Instructions for Use", Manual, Mar. 2018, p. 2, 4, and 121, Kobe, Japan, of which p. 121 (section 3-34) is considered relevant.
A copy of the Office Action (JPOA) issued on Nov. 2, 2021 in a related Japanese patent application.
Office Action (JPOA) issued on Jan. 10, 2023, in a related Japanese patent application.
Communication pursuant to Article 94(3) EPC issued on Oct. 19, 2023 in a counterpart European application.
CNOA issued on Oct. 11, 2023 in a counterpart Chinese patent application.
CNOA issued on May 17, 2024 in a counterpart Chinese patent application.
Invitation pursuant to Rule 137(4) EPC and Article 94(3) EPC issued on Apr. 26, 2022 in a counterpart European patent application.

* cited by examiner

| HOLDER NUMBER | REAGENT NAME | ... | MEASURABLE AMOUNT (RESIDUAL AMOUNT) | NUMBER OF RESIDUAL TESTS | SET DATE | SET TIME |
|---|---|---|---|---|---|---|
| A1-1 | ○× | ... | 1.2ml | 6 | 2008/10/10 | 12:00 |
| A1-2 | ○△ | ... | - | - | 2008/10/9 | 10:00 |
| ⋮ | ⋮ | ⋮ | ⋮ | ⋮ | ⋮ | ⋮ |

FIG. 9

| Category | State | Reagent Information | Operation Propriety | | | | | | | |
|---|---|---|---|---|---|---|---|---|---|---|
| | | | Reagent Replacement | Reagent Editing | Reagent Information Restoration | Residual Amount Reset | Residual Amount Measurement | Set of Lots in Use | Calibration Curve | QC Chart |
| (1) | Barcode Reading Error (Without Previous Reagent Information) | | × | ○ | × | × | × | × | × | × |
| (2) | Barcode Reading Error (With Previous Reagent Information) | | × | ○ | ○ | × | × | × | × | × |
| (3) | Unregistered Reagent | | × | ○ | × | × | × | | × | × |
| | Unregistered Reagent Lot | | × | × | × | × | × | | | |
| (4) | Residual Amount Present  LIGHT BLUE | | × | × | × | ○ | ○ | × | × | × |
| | Residual Amount Warning  YELLOW | | × | × | × | ○ | ○ | × | × | × |
| | Reagent Exhausted  RED | | × | × | × | ○ | ○ | × | × | × |
| | Residual Amount Unknown  GRAY | | × | × | × | ○ | ○ | × | × | × |

FIG. 10

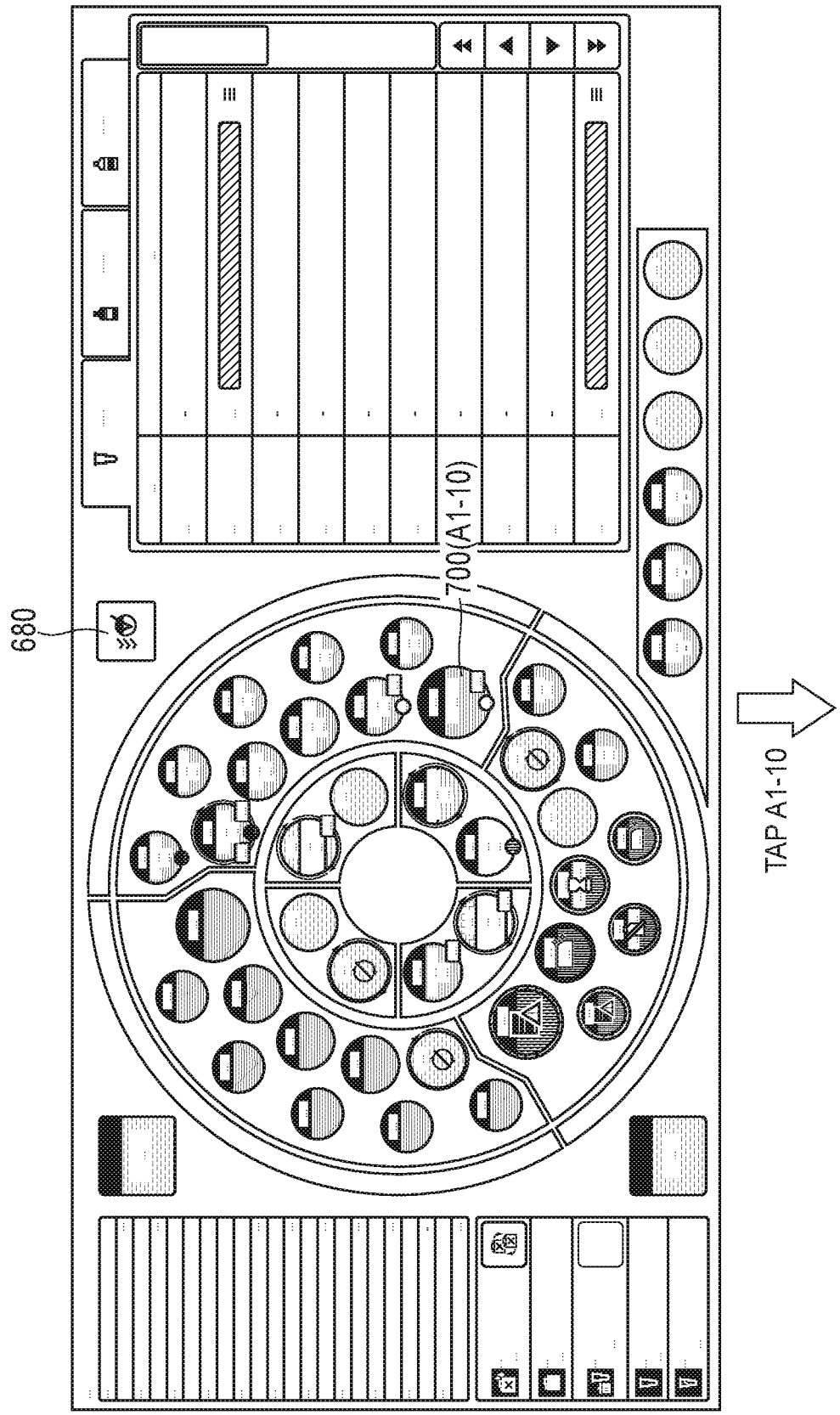

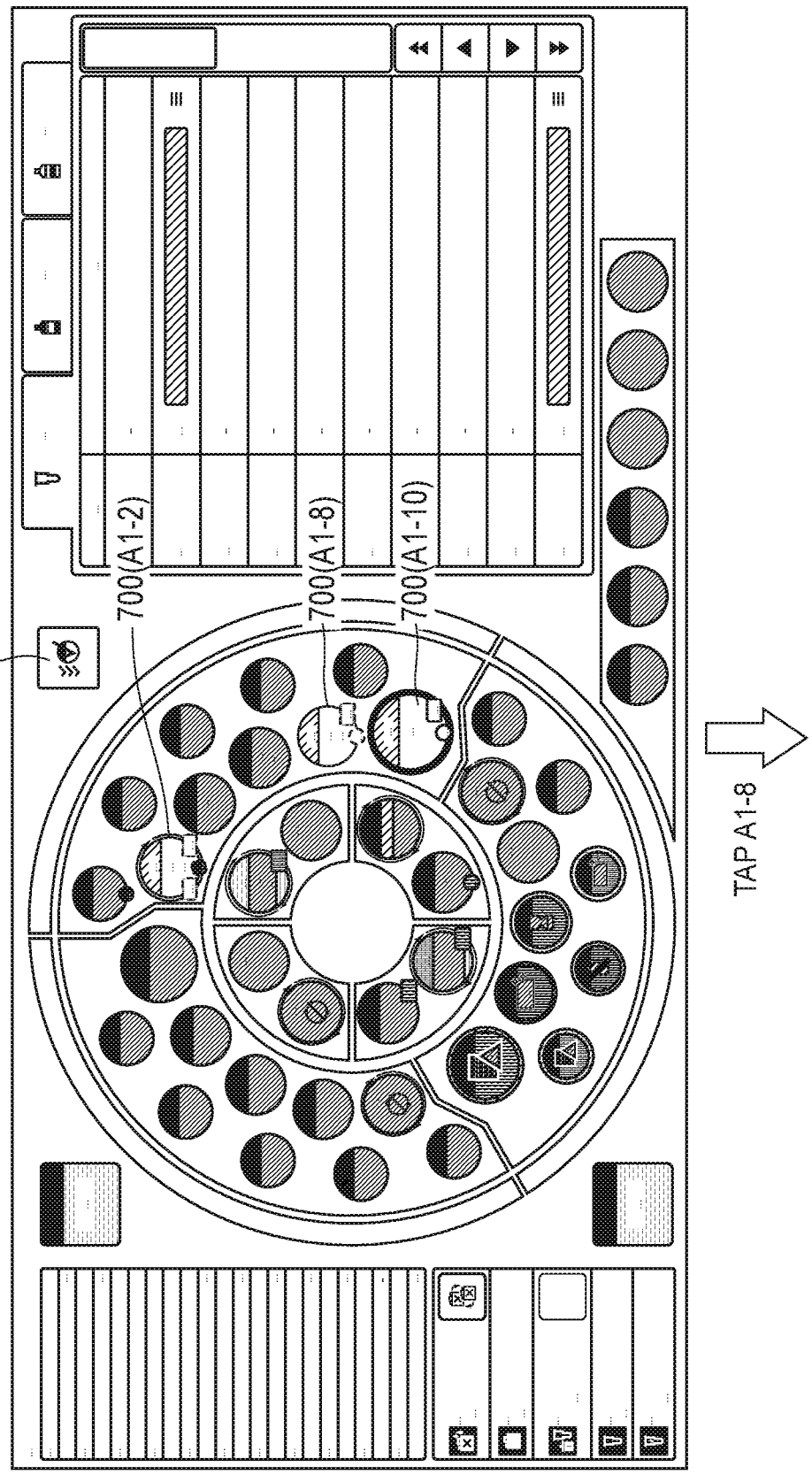

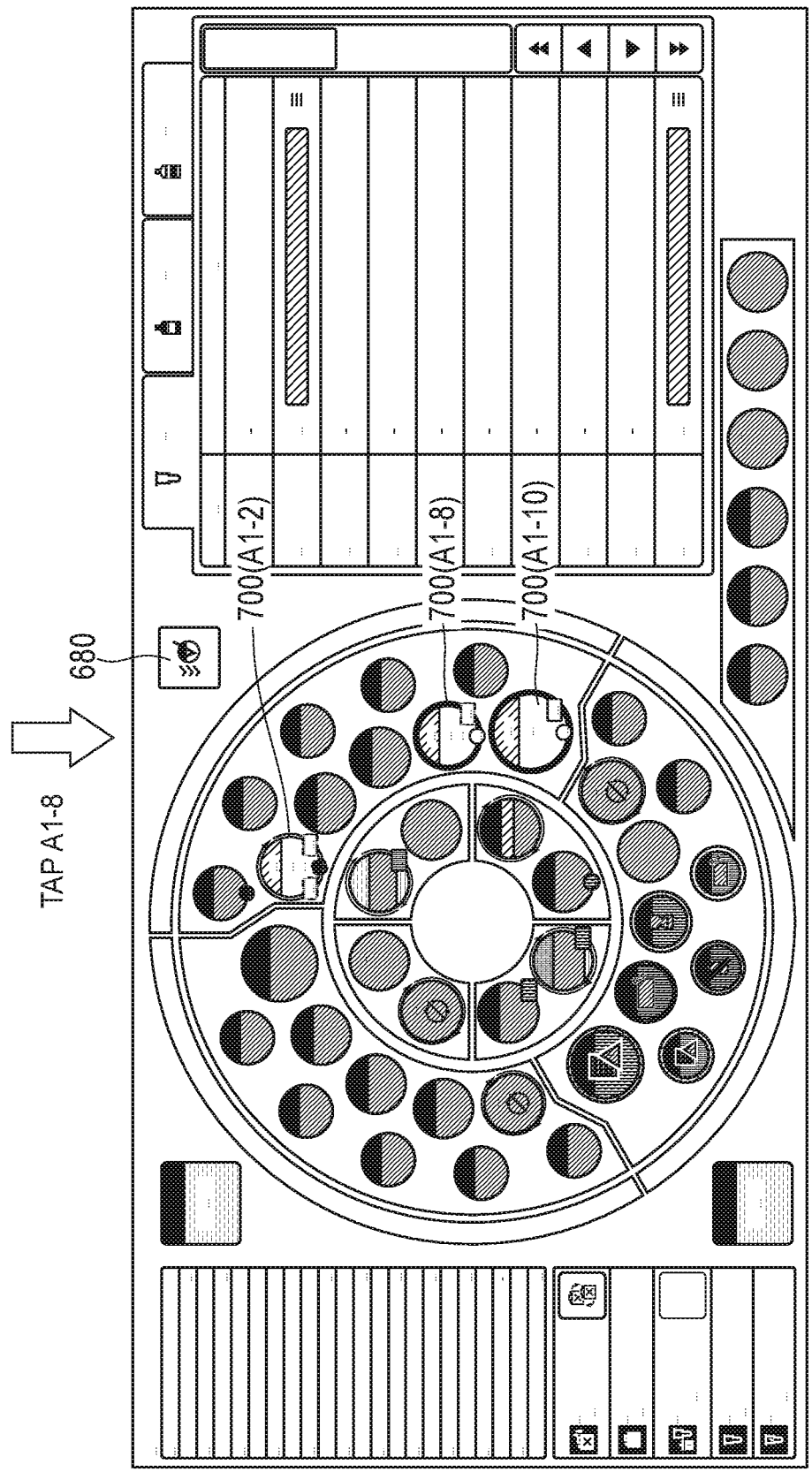

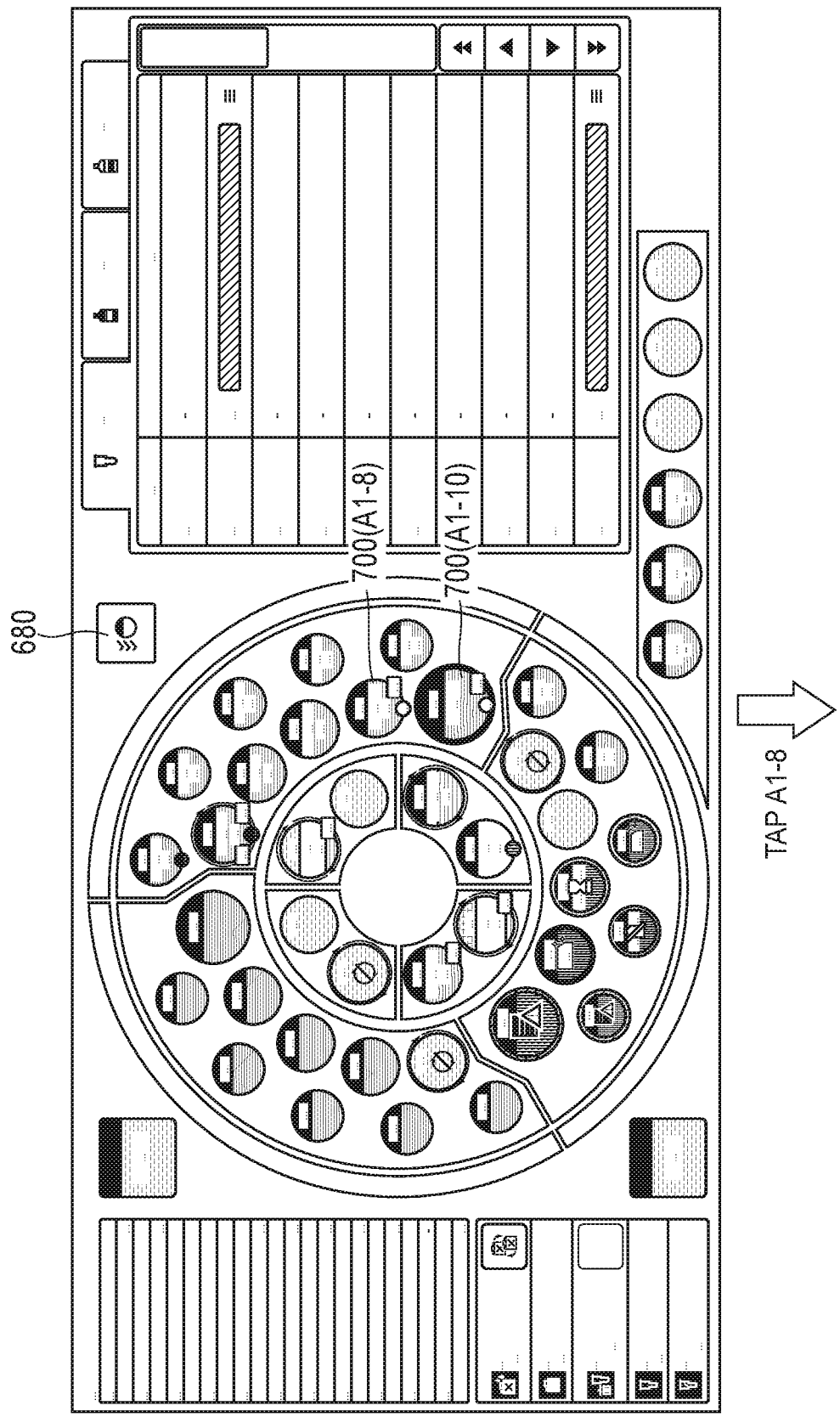

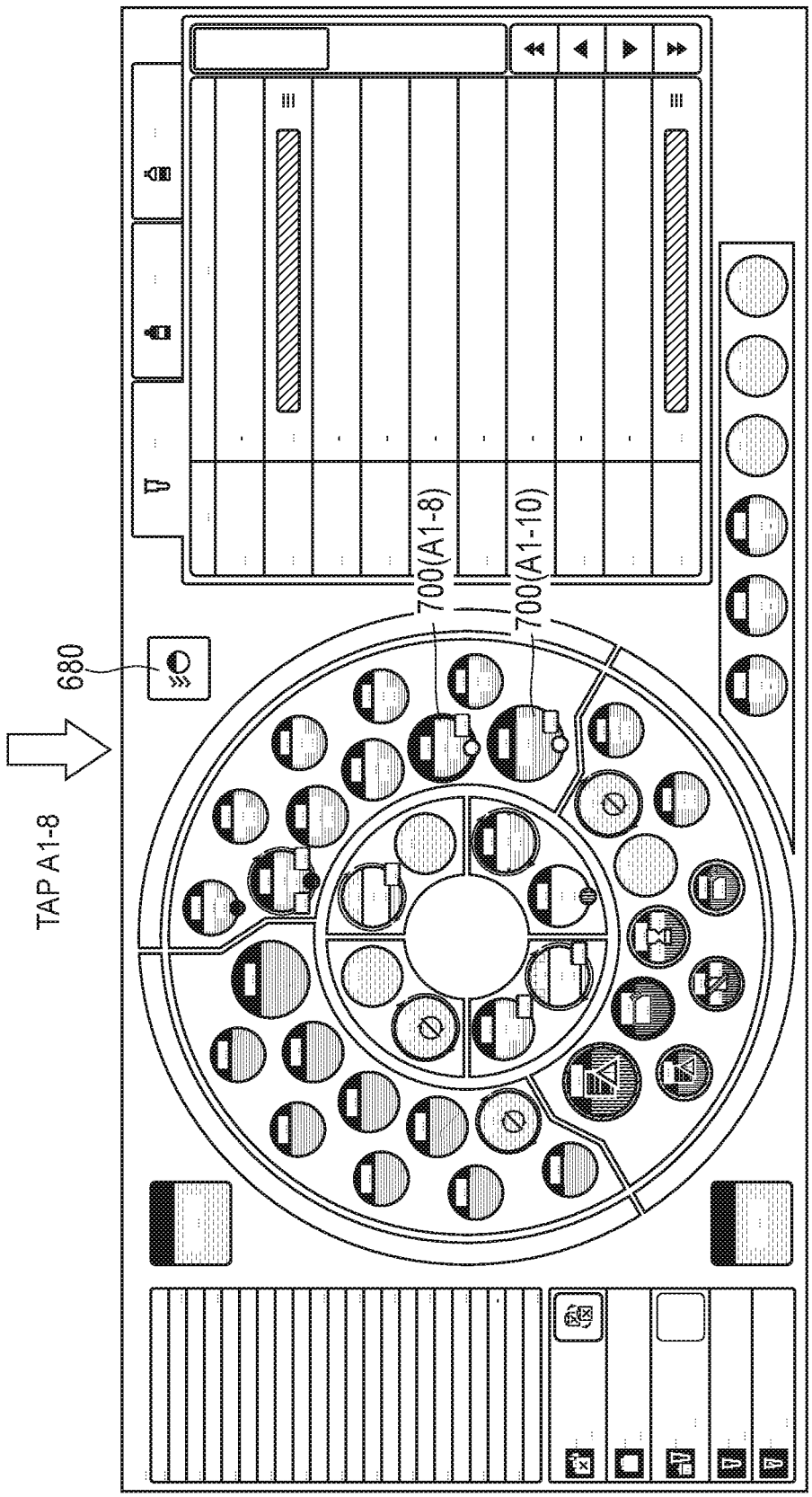

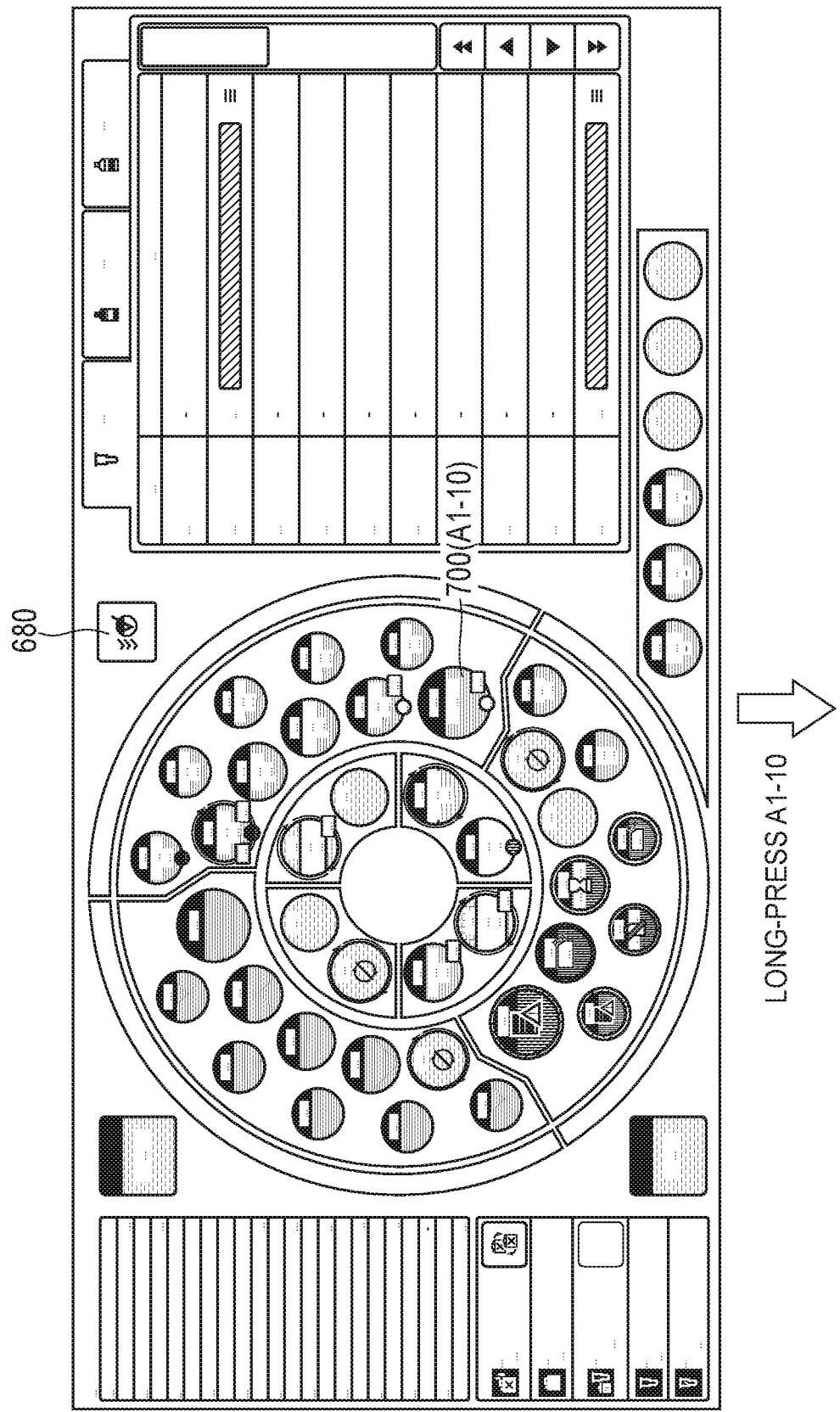

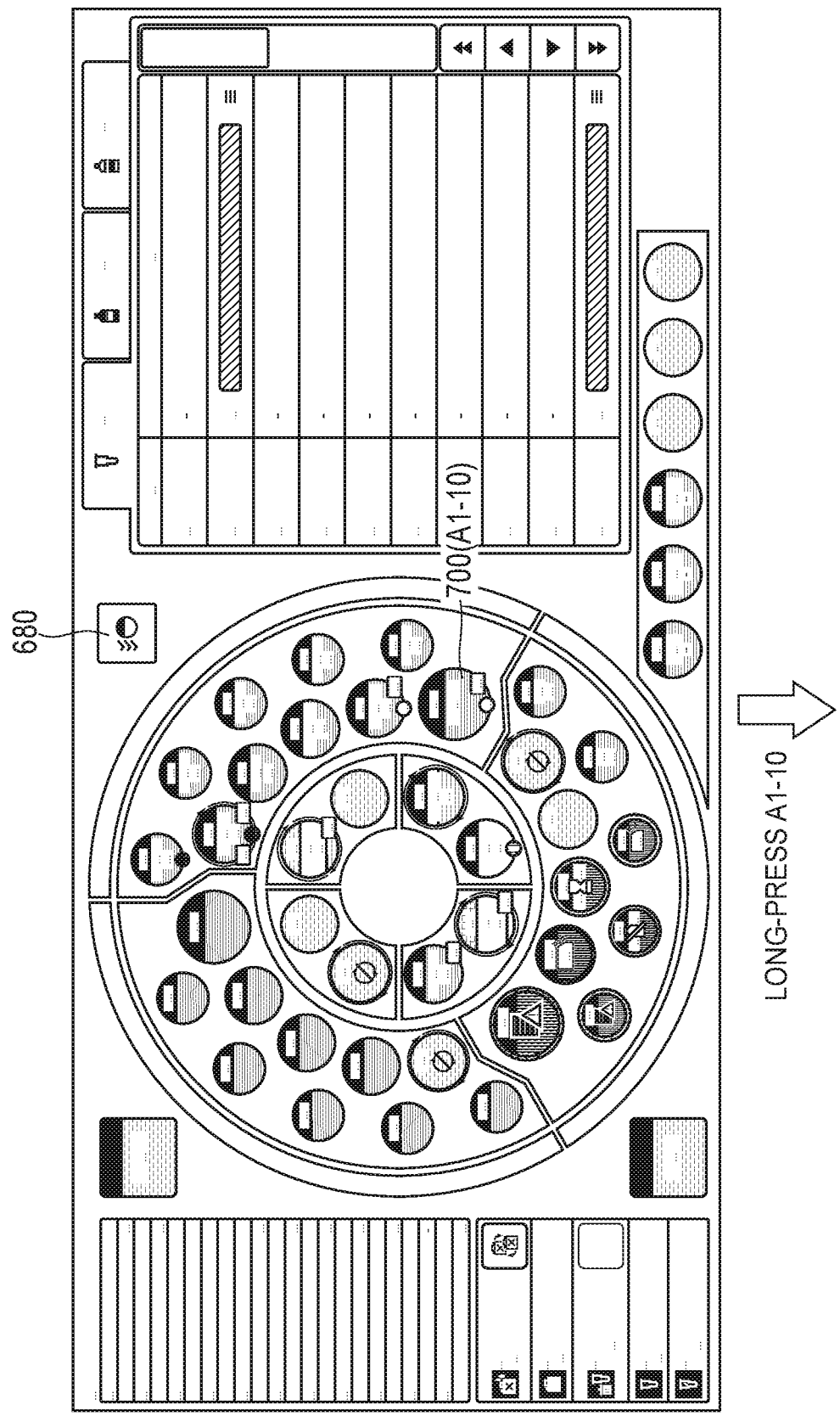

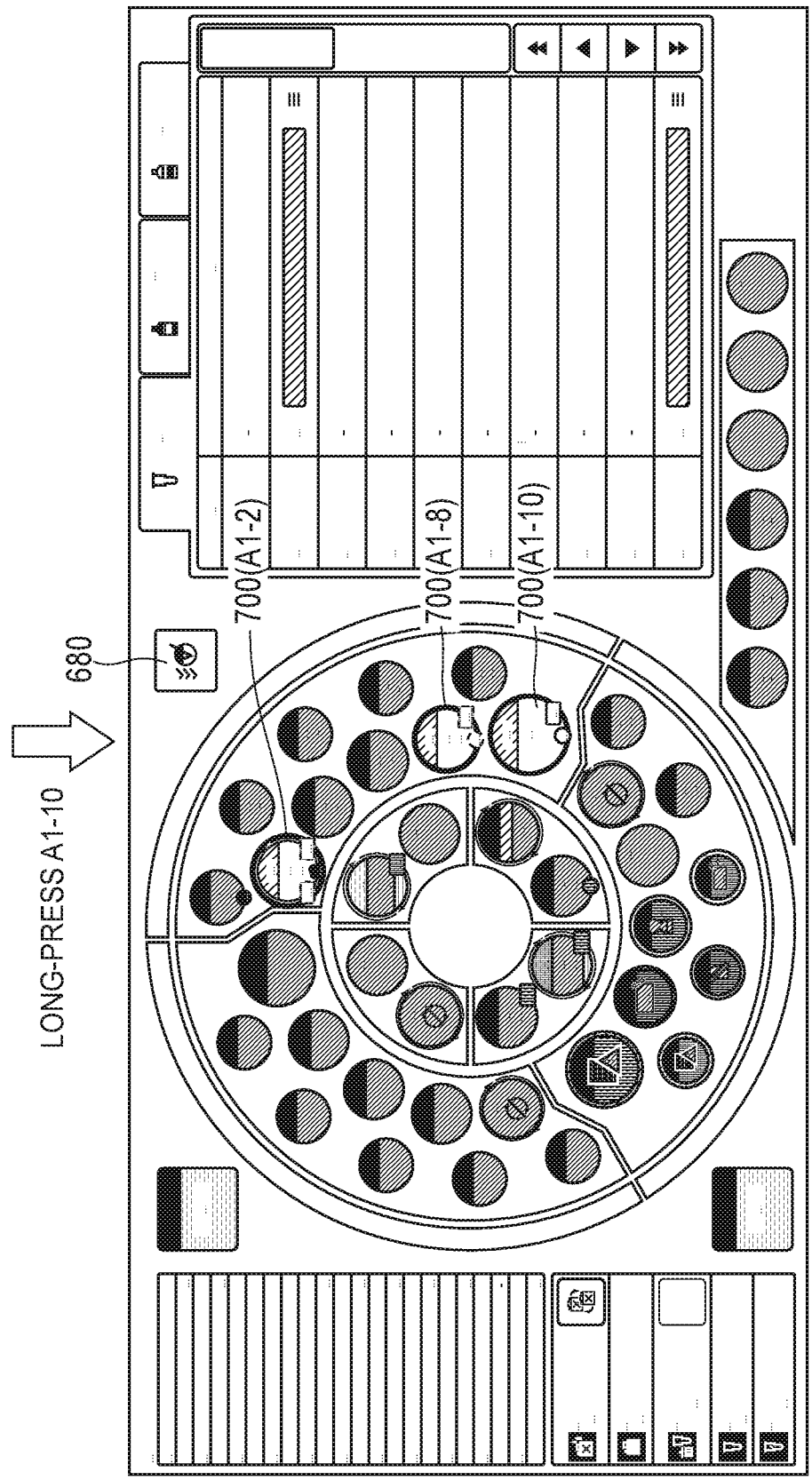

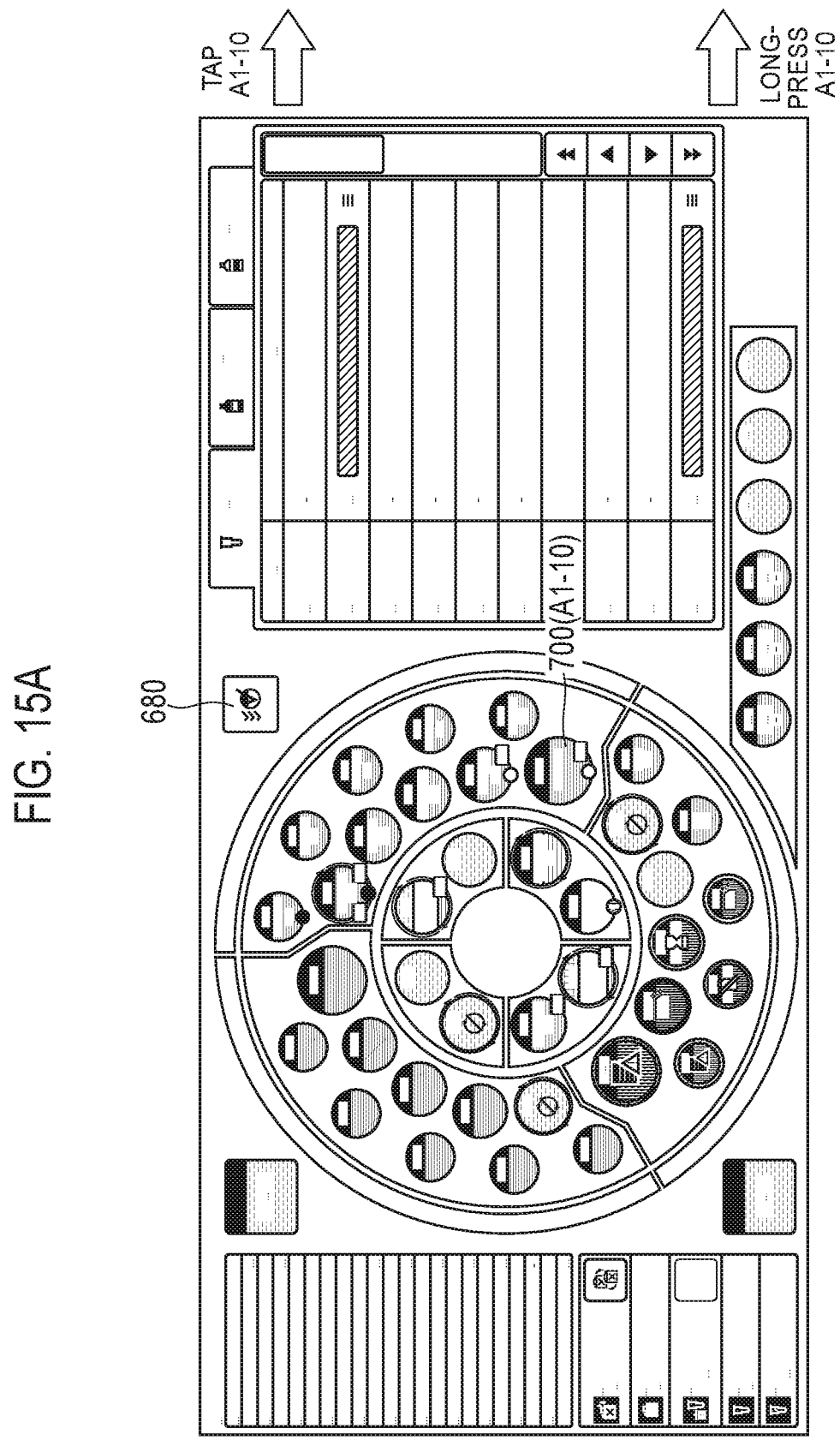

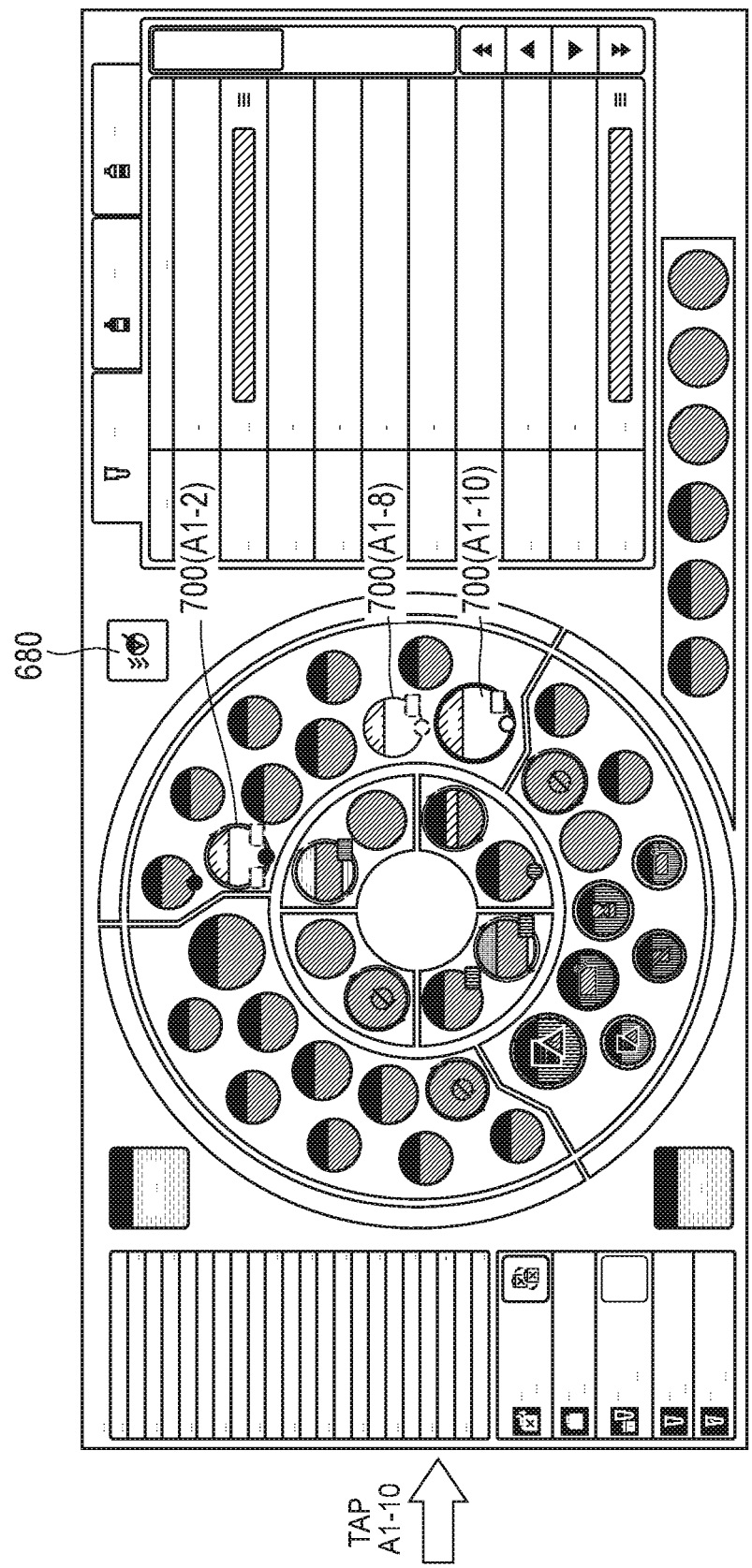

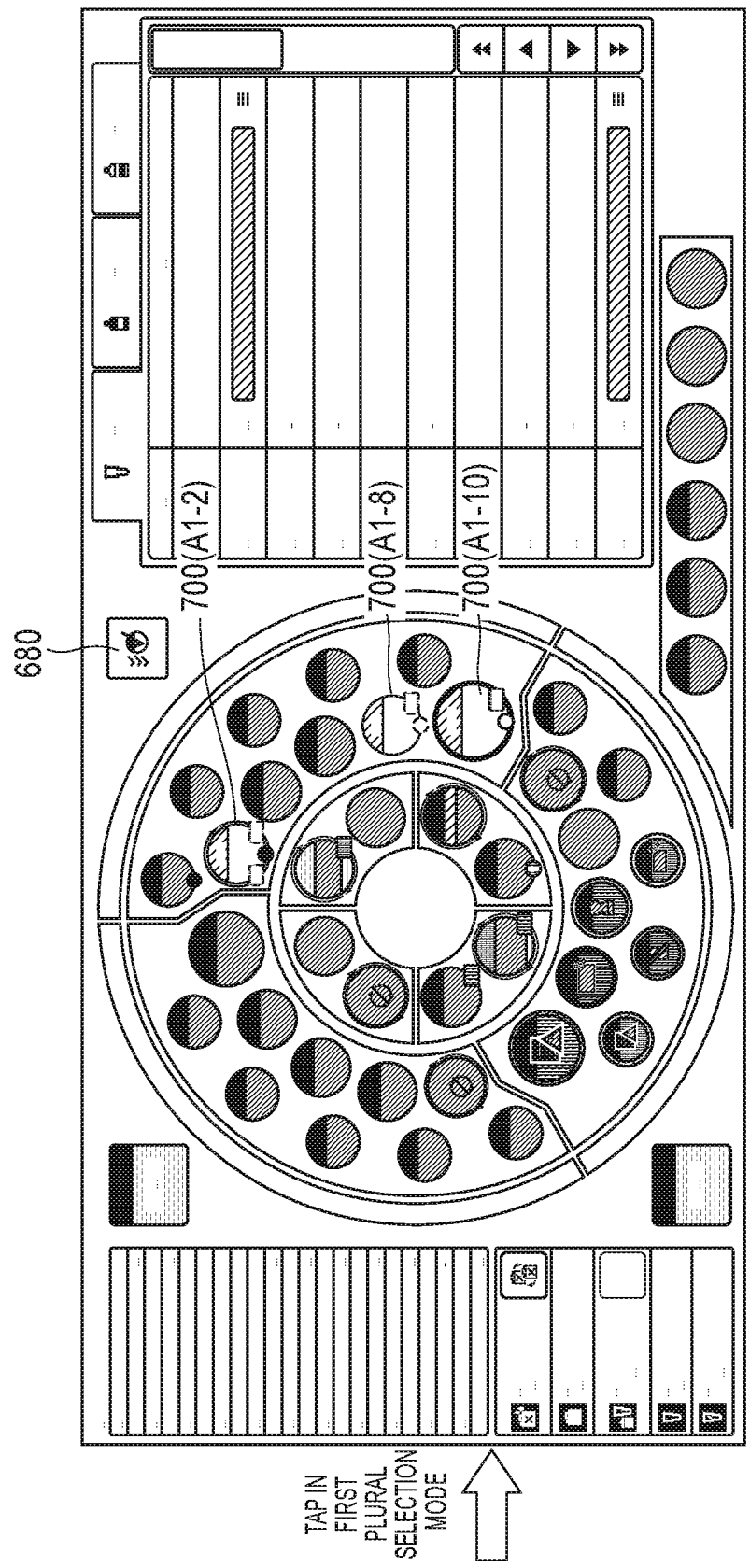

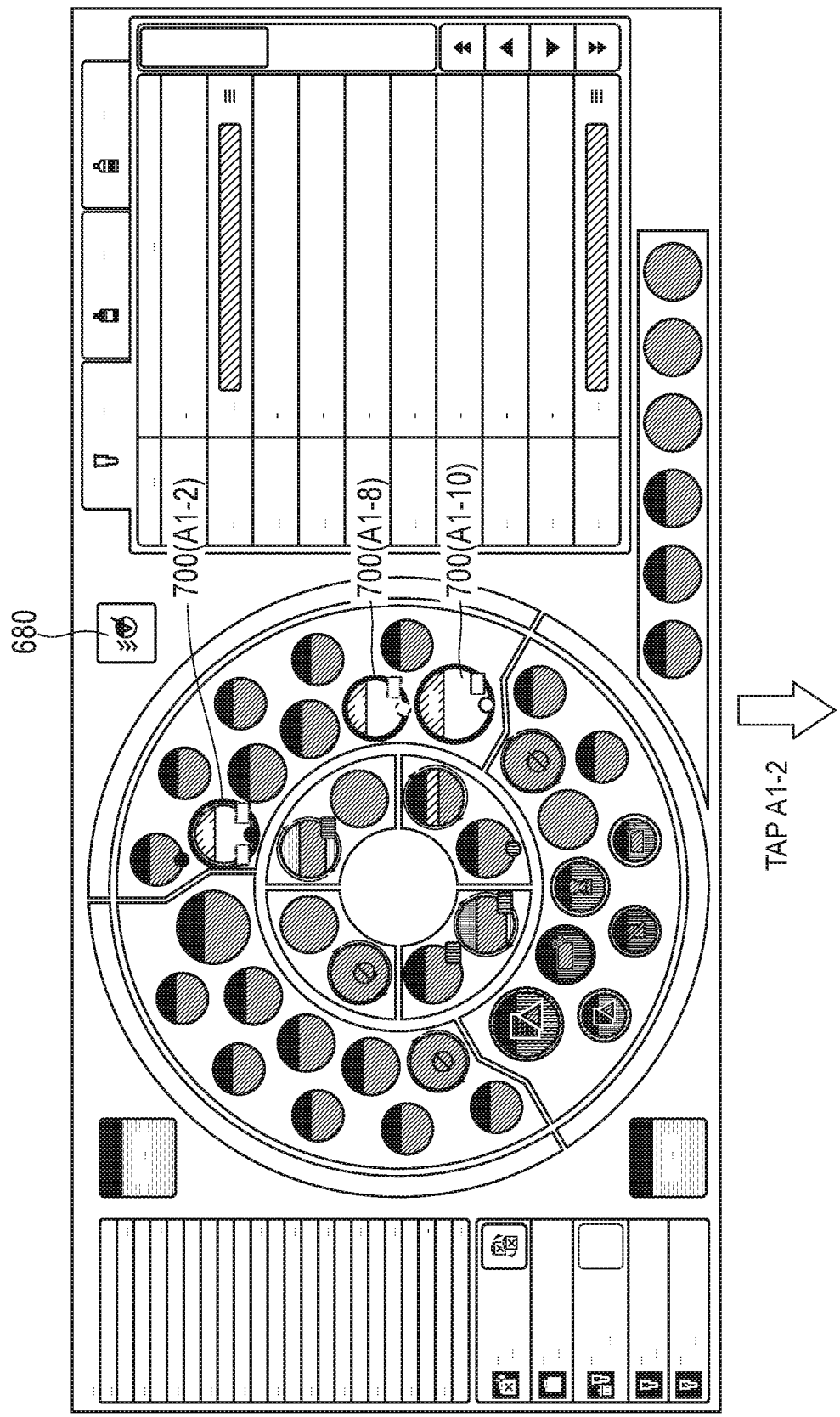

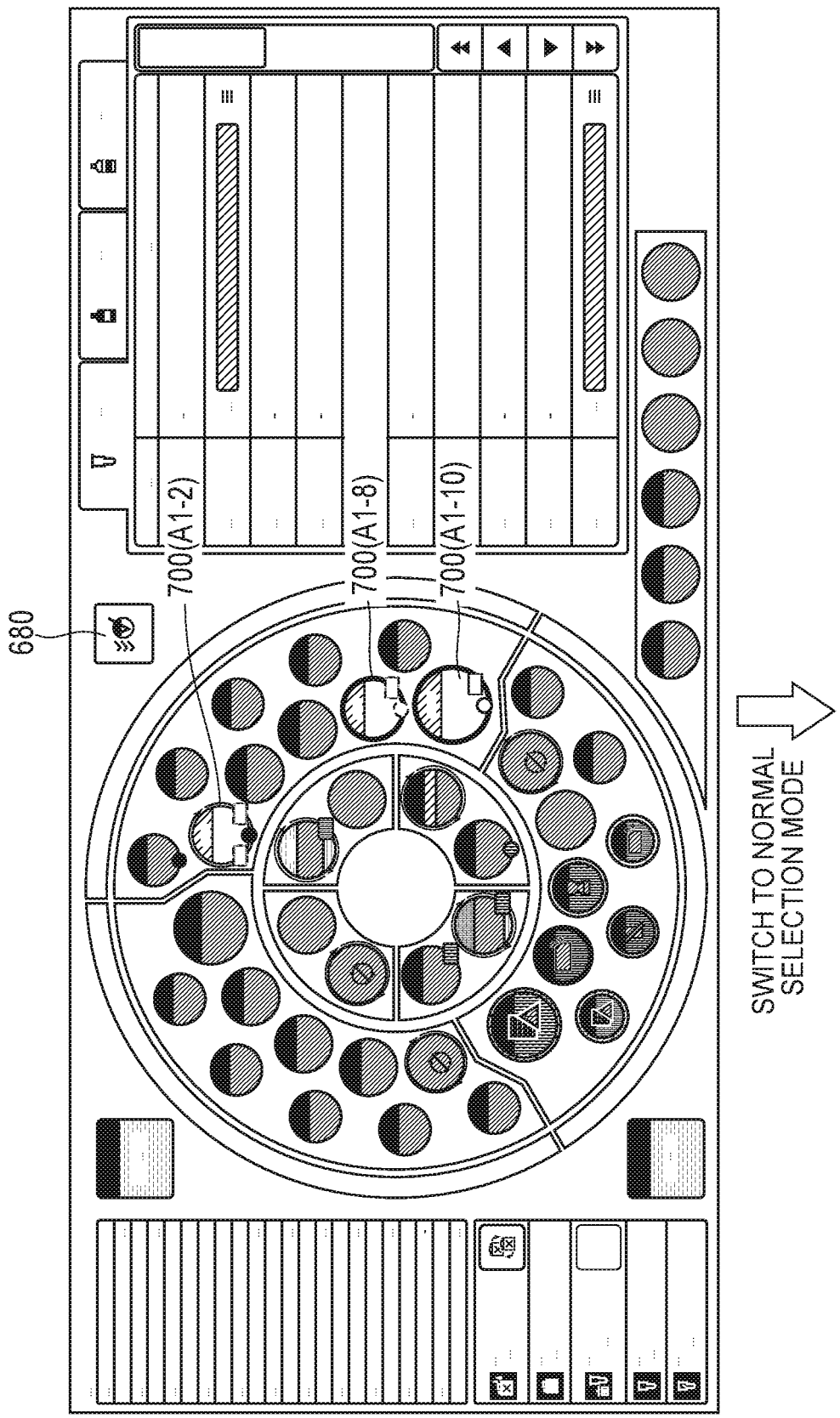

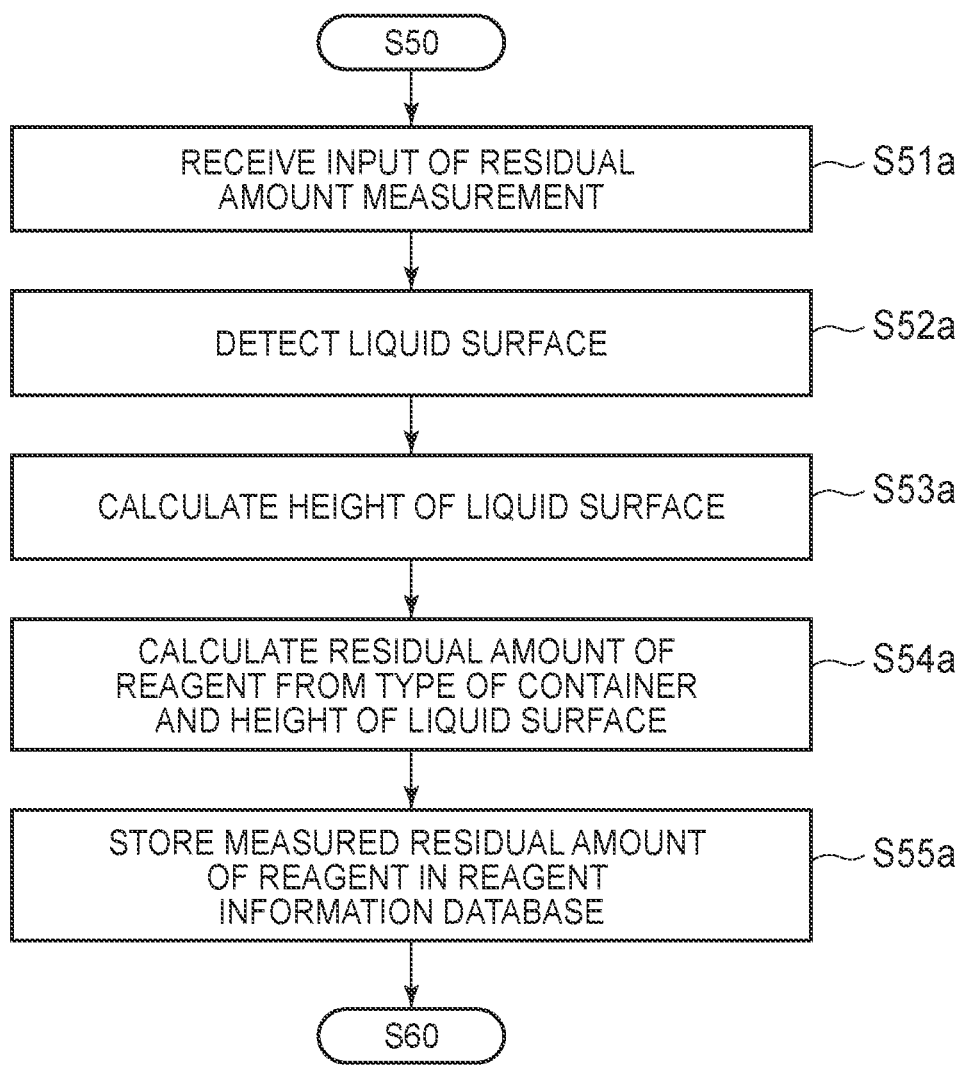

FIG. 22

DISPLAY METHOD, SAMPLE ANALYZER, AND RECORDING MEDIUM

CROSS REFERENCE TO RELATED APPLICATIONS

This application claims priority from to prior Japanese Patent Application No. 2018-186074 filed with the Japan Patent Office on Sep. 28, 2018, the entire contents of which are incorporated herein by reference.

BACKGROUND

The disclosure relates a display method in a sample analyzer that analyzes a sample using reagents, and so on.

There has been known a sample analyzer having a function of automatically measuring measurement items set for each of samples. Such a sample analyzer stores, in a housing, expendables such as reagents used for measurement of measurement items and automatically measures predetermined measurement items for each of samples set as analysis targets using these expendables. For example, the sample analyzer is capable of automatically performing the following processes (1) to (4) while sequentially replacing the samples set as the analysis targets: (1) a process for dispensing a sample into a cuvette; (2) a process for preparing a measurement specimen by taking out a reagent relevant to a measurement item from a reagent container and mixing the reagent with the sample; (3) a process for performing measurement concerning measurement items; and (4) a process for performing an analysis based on measurement results. Such a sample analyzer is very convenient when a large number of samples are continuously analyzed.

However, in order to continuously analyze a large number of samples, the sample analyzer has to be furnished with expendables such as cuvettes and reagents in amounts sufficient for the number of samples and the number of measurement items before the start of the analysis. When the amounts of the expendables stored in the sample analyzer are insufficient, it is likely that the analysis of the samples stops halfway or a failure of the sample analyzer is caused.

Therefore, there is a sample analyzer that displays, on a display unit, a display screen including icons representing reagents arranged in the sample analyzer in order that the reagents stored in the sample analyzer are appropriately managed. Information such as states of reagents used for an analysis of samples and measurement items is displayed on the display screen.

Examples of such a display screen include a display screen disclosed in Japanese Patent Application Publication No. 2009-036513 ("Patent Literature 1"). Patent Literature 1 discloses a display screen including a reagent arrangement display region A where marks M representing reagents stored in a sample analyzer is displayed and an operation means display region B where operations for the reagent are displayed (see FIG. 24). On this display screen, when any one of buttons included in the operation means display region B is selected in a state where the mark M representing any of the reagents is selected from the reagent arrangement display region A, the predetermined operation is performed for the reagent. For example, the reagent can be replaced or the reagent can be added anew.

Unlike management of cuvettes that only have to be supplied to a sample analyzer as appropriate, management of reagents needs complicated and troublesome work, a predetermined operation, and so on. This can be a burden for an operator of the sample analyzer. For example, since the reagents are consumed in different amounts to analyze one sample, it is indispensable to check the residual amounts of the reagents before an analysis start. Further, since expiration dates for use of reagents to be used to analyze samples are different among lots, it is also necessary to appropriately manage the expiration dates for use of the reagents in order to obtain analysis results with high reliability.

More specifically, when the residual amounts of the reagents are smaller than the amounts of the reagents used in a continuous analysis, the operator needs to replace or add each of the reagents. If there is a reagent, a residual amount of which is unknown, the operator needs to instruct the sample analyzer to measure the residual amount of the reagent. For reagents of unregistered lots, the operator needs to input information that should be registered such as the expiration date of use for each of the reagents. When reading of barcode information of a reagent container of a reagent fails, the operator needs to instruct the sample analyzer to read the barcode information again or needs to manually input the information.

When performing such a predetermined operation, the operator has to perform the predetermined operation for each one mark on the display screen disclosed in Patent Literature 1. That is, the operator needs to input a command to perform the predetermined operation for each reagent. This method is certain. However, when the operator desires to perform the predetermined operations for two or more reagents, the tasks to be done by the operator increase. There remains room of improvement in terms of reducing a burden of the operator.

One or more aspects have been devised in order to solve the problems described above, and may aim to provide a display method of reducing a burden of an operator who manages reagents of a sample analyzer.

SUMMARY

A display method according to one or more aspects may be a method used in a sample analyzer comprising holders configured to hold reagent containers of reagents used for an analysis of a sample. The display method may include: displaying, on a display unit, icons respectively associated with the holders; receiving selection of icons from the icons displayed on the display unit; and receiving an instruction for a predetermined operation relevant to the selected icons.

A sample analyzer according to one or more aspects may include holders configured to hold reagent containers of reagents used for an analysis of a sample; a display unit; an input unit; a controller. The controller is configured to: control the display unit to display icons respectively associated with the holders; receive, through the input unit, selection of icons from the icons displayed on the display unit; and receive, through the input unit, an instruction for a predetermined operation relevant to the selected icons.

A non-transitory computer-readable storage medium according to one or more aspects stores a program which may be executable by a computer to perform operations including: displaying, on a display unit, icons respectively associated with holders configured to hold reagent containers of reagents used for an analysis of a sample; receiving selection of icons from the icons displayed on the display unit; and receiving an instruction for a predetermined operation relevant to the selected icons.

BRIEF DESCRIPTION OF DRAWINGS

FIG. 9 is a diagram illustrating a table of an example in which reagent information is classified by categories;

FIG. 10 is a diagram illustrating a configuration example of a reagent management screen of a sample analyzer according to an embodiment;

FIG. 11A, FIG. 11B and FIG. 11C are transition diagrams illustrating a display screen in a first embodiment;

FIG. 12A and FIG. 12B are transition diagrams illustrating a display screen in a reference example;

FIG. 13A and FIG. 13B are transition diagrams illustrating a display screen in a second embodiment;

FIG. 14A and FIG. 14B are transition diagrams illustrating a display screen in a third embodiment;

FIG. 15A, FIG. 15B and FIG. 15C are transition diagrams illustrating a display screen in a modification 1;

FIG. 16A, FIG. 16B and FIG. 16C are transition diagrams illustrating a display screen in a modification 2;

FIG. 17A and FIG. 17B are transition diagrams illustrating a display screen in a modification 3-1;

FIG. 18A and FIG. 18B are transition diagrams illustrating a display screen in a modification 3-2;

FIG. 19 is a flow diagram illustrating an example of a predetermined operation in a display method according to an embodiment; in this diagram, residual amount measurement for a reagent is adopted as the predetermined operation;

FIG. 22 is a diagram illustrating an example of a configuration of a reagent information editing region;

DETAILED DESCRIPTION

Figure 1:
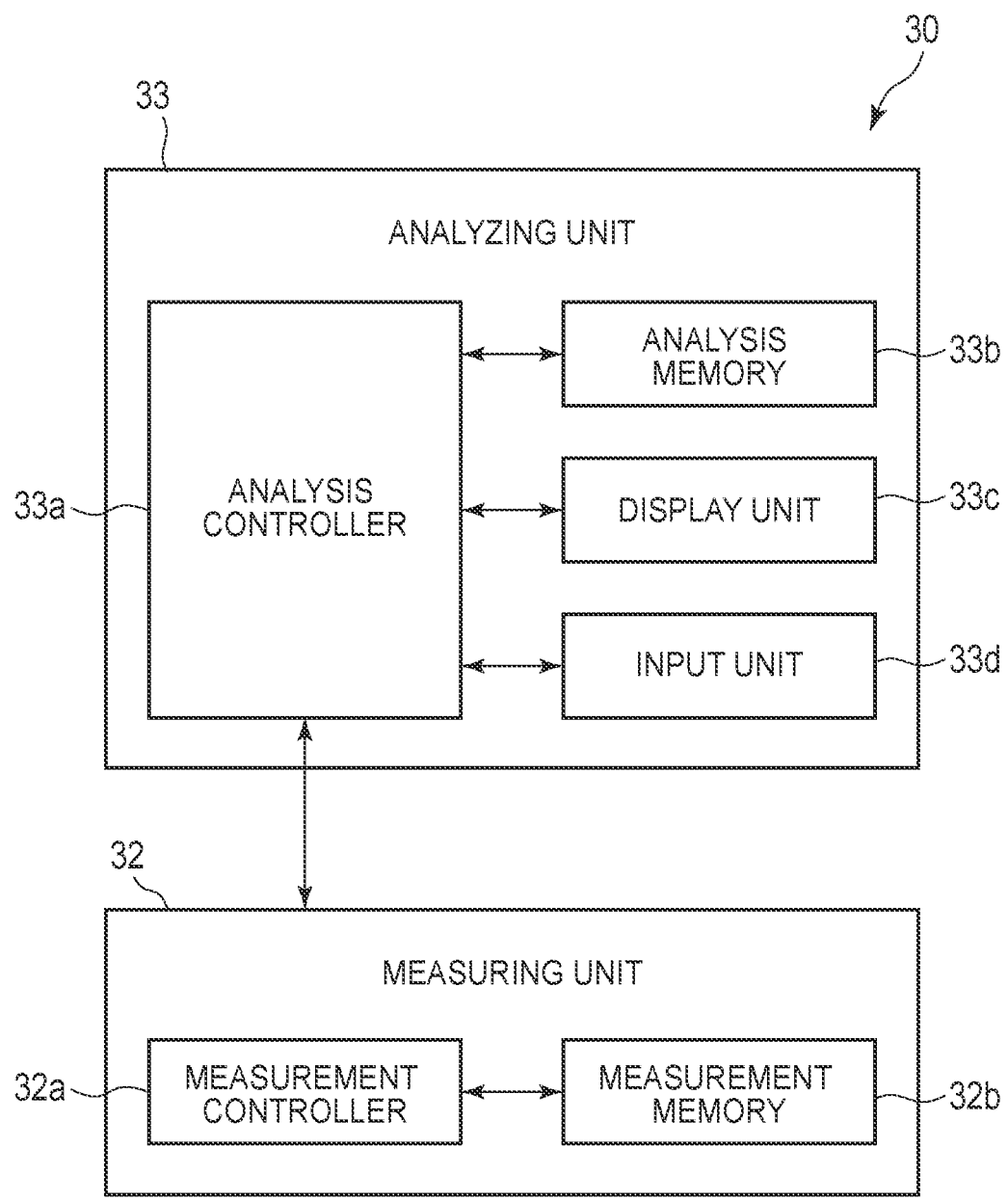
FIG. 1 is a block diagram illustrating a main part configuration of a sample analyzer according to an embodiment.

In order to solve the problems, a display method according to one or more aspects is a display method in a sample analyzer (30) including holders (441) that hold reagent containers (442) of reagents used for an analysis of a sample, the display method including: a displaying step of displaying, on a display unit (33c), icons (700) respectively associated with the holders (441); a selecting step of receiving selection of icons (700) from the icons displayed on the display unit (33c); and an operation receiving step of receiving an instruction for a predetermined operation relevant to the icons (700) selected in the selecting step.

With the configuration explained above, it is possible to select icons (700) and cause the sample analyzer (30) to perform the predetermined operation relevant to the icons (700). Therefore, an operator of the sample analyzer (30) can perform the predetermined operation relevant to icons with one operation input. Labor and time for the operation are reduced.

The icons (700) mean icons displayed on, for example, a reagent management screen (600) of the display unit (33c) of the sample analyzer (30).

Reagent information may be associated with each of the reagents. The icons (700) may be displayed in a form depending on the reagent information.

With the configuration explained above, the icons (700) are displayed in a form depending on reagent information of reagents represented by the icons (700). Therefore, the operator of the sample analyzer (30) can visually recognize the reagent information by viewing the icons (700).

The reagent information means various kinds of information on the reagents. The reagent information can also include information on states of the reagents arranged in the holders (441) included in the sample analyzer (30). The reagent information includes, for example, information for identifying the reagents, information indicating states of the reagents, and information on measurement items of the reagents. The reagent containers are sometimes not arranged in the holders (441). Therefore, the reagent information may include information indicating whether the reagent containers are arranged in the holders (441).

The predetermined operation may include (i) measurement of residual amounts of reagents, (ii) editing of reagent information on the reagents, or (iii) acquisition of the reagent information on the reagents.

With the configuration explained above, the sample analyzer (30) executes, on the reagents represented by the icons (700) selected in the selecting step, (i) measurement of residual amounts of the reagents, (ii) editing of reagent information on the reagents, or (iii) acquisition of the reagent information on the reagents. Therefore, the operator of the sample analyzer (30) can collectively perform, for reagents, (i) measurement of residual amounts of the reagents, (ii) editing of reagent information on the reagents, or (iii) acquisition of the reagent information on the reagents.

Arrangement of the icons (700) on a display screen displayed on the display unit (33c) may correspond to arrangement of the holders (441) mounted with the reagent containers (442) indicated by the icons (700).

With the configuration explained above, arrangement of the icons (700) on the display unit (33c) correspond to arrangement of the reagent containers (442) in a reagent table (440). Therefore, the operator of the sample analyzer (30) can intuitively recognize, on the display screen, actual arrangement of the reagent containers (442). Operability is further improved.

A sample analyzer (30) according to one or more aspects is a sample analyzer (30) including: holders configured to hold reagent containers of reagents used for an analysis of a sample; a display unit; an input unit; a controller. The controller is configured to: control the display unit to display icons respectively associated with the holders; receive, through the input unit, selection of icons from the icons displayed on the display unit; and receive, through the input unit, an instruction for a predetermined operation relevant to the selected icons.

With the configuration explained above, the sample analyzer (30) that can receive the instruction for the predetermined operation relevant to the icons (700) is provided.

A non-transitory computer-readable storage medium according to one or more aspects stores a program which is executable by a computer to perform operations comprising: displaying, on a display unit, icons respectively associated with holders configured to hold reagent containers of reagents used for an analysis of a sample; receiving selection of icons from the icons displayed on the display unit; and receiving an instruction for a predetermined operation relevant to the selected icons.

With the configuration explained above, the non-transitory computer-readable storage medium storing a program for controlling the sample analyzer (30) to be able to receive the instruction for the predetermined operation relevant to the icons (700) is provided.

According to one or more aspects, there is provided a display method of reducing a burden of an operator who manages reagents of a sample analyzer.

An embodiment is explained below with reference to the drawings.

First, the structure of a sample analyzer 30 according to an embodiment is explained with reference to FIG. 1 and FIG. 2. As illustrated in FIG. 1, the sample analyzer 30 includes a measuring unit 32 and an analyzing unit 33.

Figure 2:
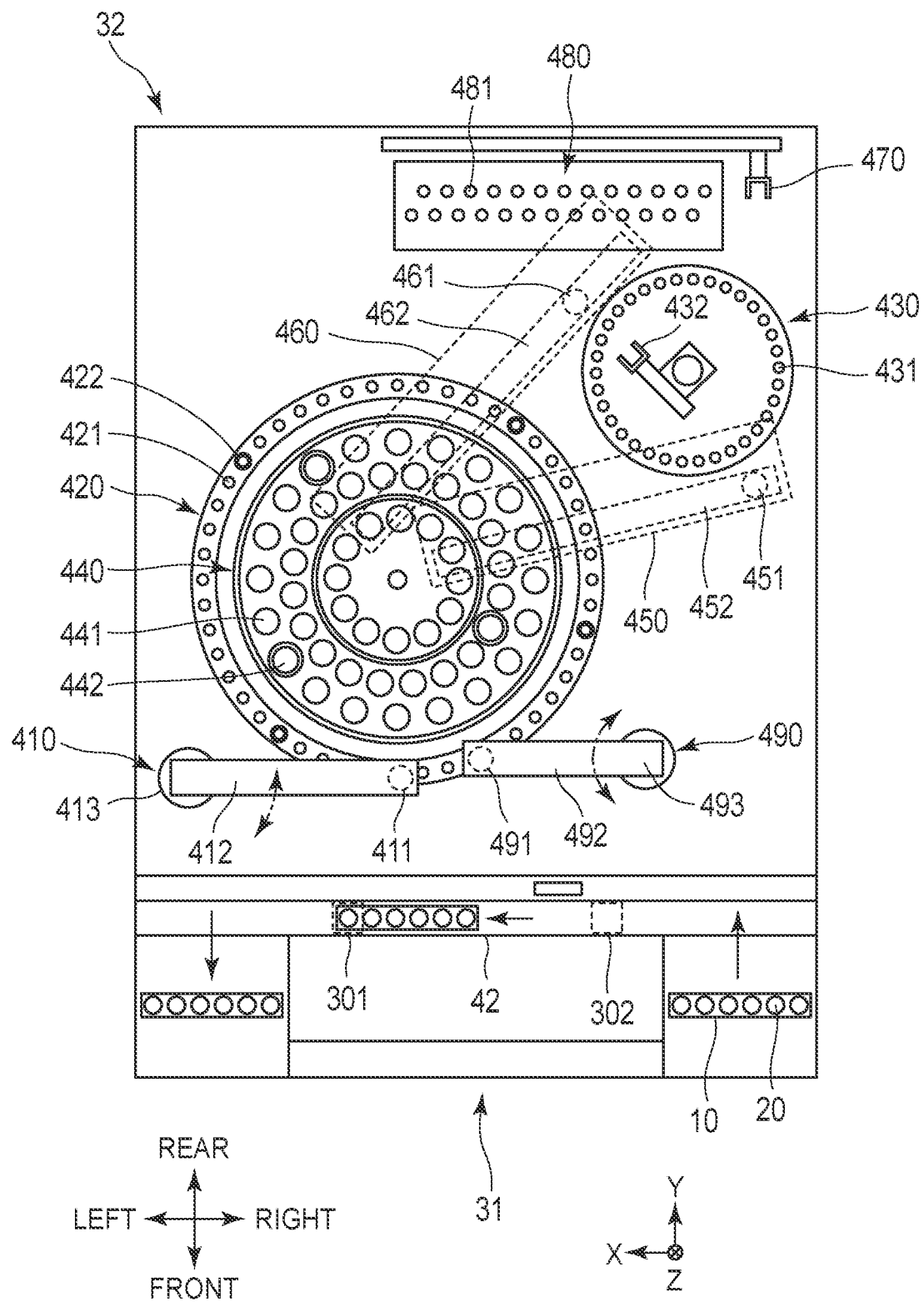
FIG. 2 is a diagram illustrating a schematically top view of a measuring unit of a sample analyzer according to an embodiment.

The measuring unit 32 includes a measurement controller 32a, a measurement memory 32b, and various functional units illustrated in FIG. 2. The measurement controller 32a is, for example, a CPU. The measuring memory 32b is, for example, a ROM, a RAM, or a hard disk. The measurement controller 32a controls the units in the measuring unit 32 according to programs and data stored in the measurement memory 32b. The measurement controller 32a performs, for example, measurement necessary for a blood coagulation analysis of a sample and sends a result of the measurement to the analyzing unit 33.

The analyzing unit 33 includes an analysis controller 33a, an analysis memory 33b, a display unit 33c, and an input unit 33d. The analysis controller 33a is, for example, a CPU. The analysis memory 33b is, for example, a ROM, a RAM, or a hard disk. The analysis controller 33a controls the units in the analyzing unit 33 and the measuring unit 32 according to programs and data stored in the analysis memory 33b. The display unit 33c is, for example, a liquid crystal display. The input unit 33d is, for example, a mouse and a keyboard. The display unit 33c and the input unit 33d may be integrally configured by, for example, a display of a touch panel type.

The analysis controller 33a may be realized by hardware (for example, using a logic circuit formed in an integrated circuit or the like). Alternatively, the analysis controller 33a may be realized by software (for example, using a device including one or more processors and a computer-readable recording medium storing a program for causing a computer to realize functions).

The analysis controller 33a performs, for example, a blood coagulation analysis of a sample based on a measurement result received from the measuring unit 32. In this case, the analysis controller 33a performs an analysis concerning measurement item such as PT, APTT, Fbg, an exogenous coagulation factor, an endogenous coagulation factor, a coagulation XIII-th factor, HpT, TTO, FDP, D dimer, PIC, FM, ATIII, PIg, APL, PC, VWF:Ag, VWF:RCo, ADP, collagen, and epinephrine.

As illustrated in FIG. 2, the measuring unit 32 is arranged behind a transporter 31. The measuring unit 32 performs measurement necessary for the blood coagulation analysis. In this case, a sample stored in a sample container 20 is plasma.

Note that liquid stored in the sample container 20 as the sample is not limited to the plasma. That is, the sample stored in the sample container 20 is not limited to the plasma and may be whole blood, serum, urine, lymph, celomic fluid, or the like. For example, when the measuring unit 32 performs measurement concerning a blood cell test on the sample, the sample can be whole blood. For example, when the measuring unit 32 performs measurement concerning a blood coagulation test, an immune test, or a biochemical test on the sample, the sample can be plasma. For example, when the measuring unit 32 performs measurement concerning the immune test or the biochemical test on the sample, the sample can be serum.

The measuring unit 32 includes a sample dispensing unit 410, a reaction container table 420, a heating table 430, a reagent table 440, reagent dispensing units 450 and 460, a transferring unit 470, a detecting unit 480, and a sample dispensing unit 490.

The sample dispensing unit 410 includes an aspirator 411, an arm 412, and a mechanism unit 413. The sample dispensing unit 410 aspirates, via the aspirator 411, the sample from the sample container 20 set in a sample rack 10 and located in an aspiration position 301. Thereafter, the sample dispensing unit 410 discharges the aspirated sample to a reaction container 422 held by holding holes 421 of the reaction container table 420.

Like the sample dispensing unit 410, the sample dispensing unit 490 includes an aspirator 491, an arm 492, and a mechanism unit 493. The aspirator 491 is set at the distal end of the arm 492. The aspirator 491 is configured by a nozzle. The mechanism unit 493 is configured to rotate the arm 492 in the circumferential direction and move the arm 492 in the up-down direction. Consequently, the aspirator 491 is capable of moving in the circumferential direction and the up-down direction.

The sample dispensing unit 490 is set in the sample rack 10. The sample dispensing unit 490 lowers the aspirator 491 from the upper side with respect to the sample container 20 positioned in an aspiration position 302 on a conveying path 42a of a rack transporter 42 and inserts the aspirator 491 into the sample container 20. The sample dispensing unit 490 aspirates the sample from the sample container 20 via the aspirator 491 and discharges the aspirated sample to the reaction container 422 held in the holding holes 421 of the reaction container table 420.

The reaction container table 420 has a ring shape in a plan view and is arranged on the outer side of the reagent table 440. The reaction container table 420 is configured to be rotatable in the circumferential direction. The reaction container table 420 includes the holding holes 421 for holding the reaction container 422.

The heating table 430 includes holding holes 431 for holding the reaction container 422 and a transferring unit 432 for transferring the reaction container 422. The heating table 430 has a circular contour in a plan view and is configured to be rotatable in the circumferential direction. The heating table 430 heats the reaction container 422 set in the holding holes 431 to 37° C.

When the sample is discharged to the reaction container 422 held by the reaction container table 420, the reaction container table 420 is rotated and the reaction container 422 storing the sample is transferred to the vicinity of the heating table 430. The transferring unit 432 of the heating table 430 grips the reaction container 422 and sets the reaction container 422 in the holding holes 431 of the heating table 430.

Holders 441 are provided in the reagent table 440. Reagent containers 442 storing reagents used for measurement necessary for the blood coagulation analysis can be held by the holders 441. That is, the reagent containers 442 can be held by the reagent table 440. The reagent table 440 is configured to be rotatable in the circumferential direction. The reagent containers 442 storing reagents used for measurement of measurement items are set on the reagent table 440.

The reagent dispensing unit 450 includes a nozzle 451 and a mechanism unit 452. The mechanism unit 452 is configured to move the nozzle 451 in the horizontal direction to traverse the reagent table 440 and move the nozzle 451 in the up-down direction. Similarly, the reagent dispensing unit 460 includes a nozzle 461 and a mechanism unit 462. The mechanism unit 462 is configured to move the nozzle 461 in the horizontal direction to traverse the reagent table 440 and move the nozzle 461 in the up-down direction. The reagent dispensing units 450 and 460 are set on the lower side of a housing upper surface of the measuring unit 32.

The reagent dispensing units 450 and 460 dispense the reagent into the reaction container 422 heated by the heating table 430. In the dispensing of the reagent, the transferring unit 432 or the transferring unit 470 takes out the reaction container 422 from the holding holes 431 of the heating table 430 and positions the reaction container 422 in a predetermined position near the heating table 430. The reagent dispensing units 450 and 460 aspirate the reagent from the reagent containers 442 via the nozzles 451 and 461 and discharge the aspirated reagent to the reaction container 422. Consequently, the reagent is mixed in the sample and a measurement specimen is prepared. Thereafter, the transferring unit 470 sets the reaction container 422 in holding holes 481 of the detecting unit 480.

A measurement principle of the detecting unit 480 is, for example, a coagulation method, a synthetic substrate method, immunonephelometry, or an agglutination method. The detecting unit 480 includes holding holes 481. The detecting unit 480 irradiates light on the reaction container 422 set in the holding holes 481, receives the light transmitted through a measurement specimen, and outputs a signal corresponding to light reception intensity. The measurement controller 32a of the measuring unit 32 stores, as a measurement result, a signal output from the detecting unit 480 and transmits the measurement result to the analyzing unit 33.

[Units Related to the Display Method]

Units related to the display method according to an embodiment are explained with reference to FIG. 3.

Figure 3:
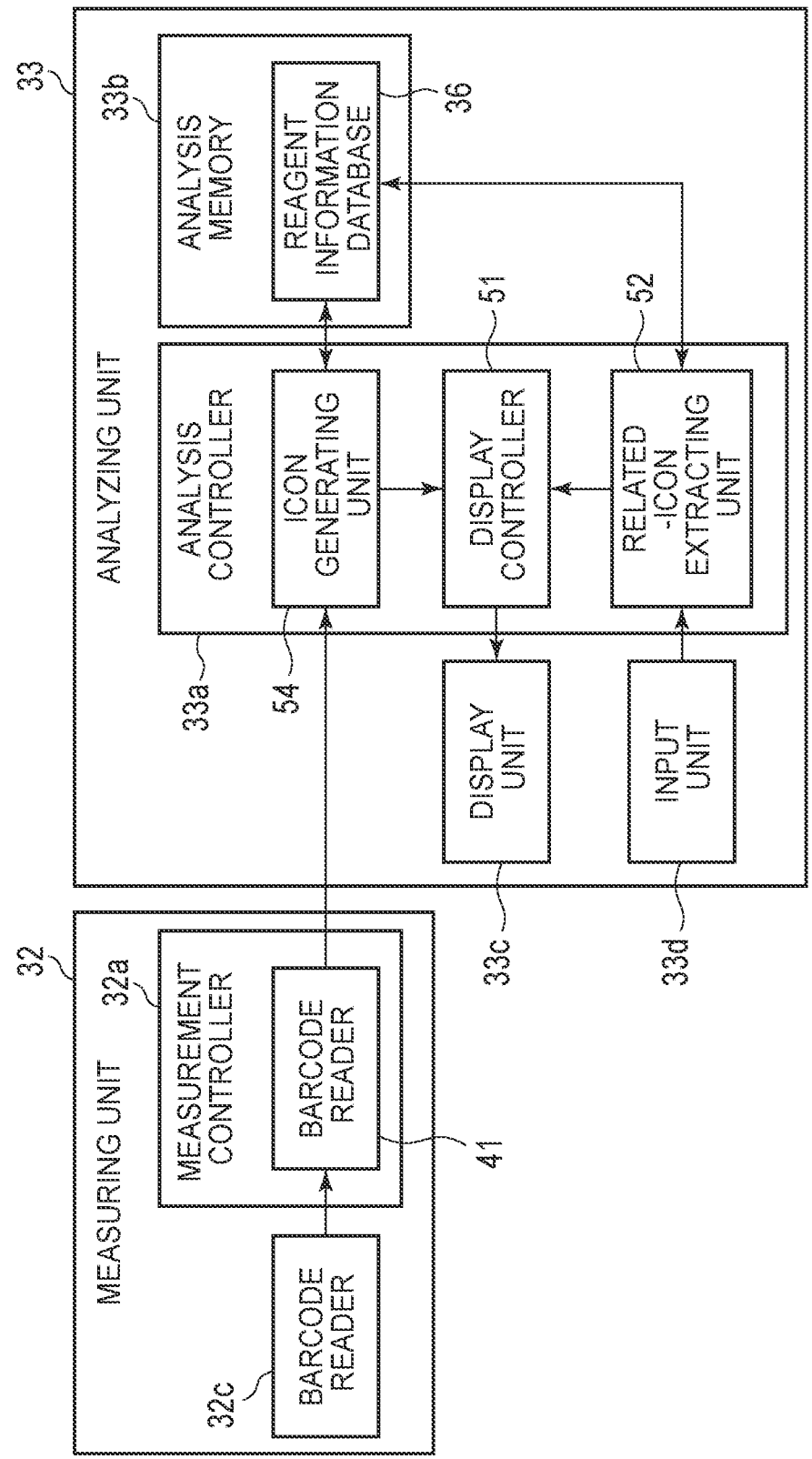
FIG. 3 is a block diagram illustrating units related to a display method according to an embodiment.

In FIG. 3, the measuring unit 32 includes a barcode reader 32c (concerning the measurement controller 32a, explanation is omitted because the measurement controller 32a is as explained above). The measurement controller 32a includes a barcode reader 41. The barcode reader 41 receives information read from a barcode by the barcode reader 32c and sends the information to the units.

The analysis controller 33a includes a display controller 51, a related-icon extracting unit 52, and an icon generating unit 54.

The display controller 51 receives data necessary for generation of a display screen from the units and causes the display unit 33c to display the display screen. The related-icon extracting unit 52 extracts, based on input for selecting one icon 700 via the input unit 33d, icons 700 classified as icons 700 related to the one icon 700. The icon generating unit 54 acquires reagent information associated with received barcode information referring to the reagent information database 36 stored in the analysis memory 33b and generates the icon 700 including the reagent information.

Note that the main part configurations of the measurement controller 32a and the analysis controller 33a explained above are examples. Both the controllers may be realized by hardware (for example, a logic circuit formed in an integrated circuit or the like) or may be realized by software (for example, a device including one or more processors and a computer-readable recording medium storing programs for causing a computer to realize functions).

A sequence of processing in executing the display method according to an embodiment is explained with reference to FIG. 4.

In S10, a power supply of the sample analyzer 30 is turned on. Consequently, the sample analyzer 30 starts.

In S20, the measuring unit 32 performs reading of barcode information. Specifically, the barcode reader 32c reads a barcode provided on the reagent container 442 or a reagent container rack 440a. The read barcode information is sent to the analyzing unit 33. Details of step S20 are separately explained below.

In S30, an icon is displayed on the display unit 33c. Specifically, the icon generating unit 54 reads out reagent information from the reagent information database 36 and generates an icon. At this time, the icon generating unit generates an icon concerning each of reagents held by the reagent table 440. The generated icon is sent to the display controller 51 and displayed on the display unit 33c.

Figures 5, 6:
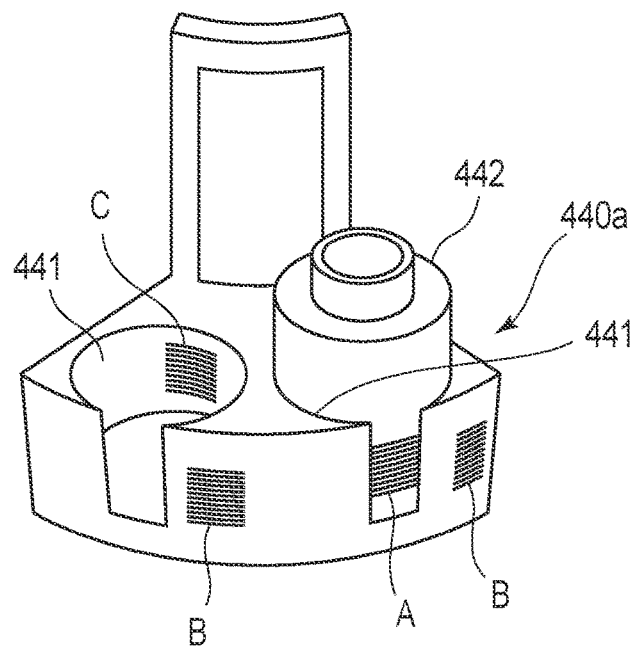
FIG. 5 is a diagram illustrating an example of a configuration of a reagent information database.
FIG. 6 is a diagram illustrating a perspective view of a state where a reagent container is held in a reagent container rack.

The reagent information database 36 is a relational database and includes fields of a holder number, a reagent name, a lot number, a residual amount, a remaining number of times of use, a set date, a set time, and the like (see FIG. 5). In the following description, "reagent" indicates the reagent container 442 and reagents stored in the reagent container 442. The holder number is a number allocated to each of the holders 441 that hold the reagents. Each records is associated with one reagent among reagents arranged on the reagent table 440.

In S40, an operation or an input of selecting icons 700 out of icons displayed on the display unit 33c is received via the input unit 33d. In an embodiment, the operation is selection of one icon 700. In this case, the related-icon extracting unit 52 extracts icons 700 related to the selected one icon 700 and sends the icons 700 to the display controller 51. The display controller 51 causes the display unit 33c to display the selected one icon 700 and the icons 700 related to the one icon in a form distinguishable from the other icons 700. Examples of the different form include changing a color of the icon 700, changing the brightness of the icon 700, or changing the shape of the icon 700.

In S50, an input for causing the sample analyzer 30 to perform the predetermined operation is received via the input unit 33d. This operation input may be processed by the analysis controller 33a. Alternatively, after being sent to the measuring unit 32, the operation input may be processed by the measurement controller 32a. As a result of the predetermined operation, the reagent information changes from a point in time of S30. For example, reagent information may be input anew or reagents may be supplied.

In S60, the reagent information changed in the stage of S50 is written in the reagent information database 36. Consequently, the reagent information included in the reagent information database 36 is updated to the latest reagent information. Thereafter, an icon including the updated reagent information is displayed on the display unit 33c by the same processing as S30.

In S70, the power supply of the sample analyzer 30 is turned off. Consequently, the sample analyzer 30 ends the operation.

[Reading Step for Barcode Information]

The processing in the barcode information reading step (S20) is explained with reference to FIG. 6 and FIG. 7. In S20, a barcode provided on the reagent container 442 or the reagent container rack 440a is read.

FIG. 6 is a perspective view illustrating the reagent container rack 440a. Reagent container racks 440a are arranged on the reagent table 440. The holders 441 are provided in the reagent container rack 440a. It is possible to cause the holders 441 to hold the reagent containers 442 (see the holder 441 on the right side). If the reagent container rack 440a is designed by differentiating the inner diameters of the holders 441 or adapters (not illustrated in the figure) are attached to the holders 441, it is possible to cause the holders 441 to hold the reagent containers 442 having various sizes.

A barcode A is provided on the reagent container 442. A barcode B is provided on the front surface side of the outer side surface of the holder 441. A barcode C is provided on the inner side surface of the holder 441.

The barcode A includes detailed information of a reagent stored in the reagent container 442 (information such as a reagent name, a type of a reagent container, a lot number, and an expiration date of the reagent). The barcode B includes position information (holder numbers) for identifying the position of each of the holders 441. The barcode C includes information indicating that the held reagent container 442 is absent.

Figure 7:
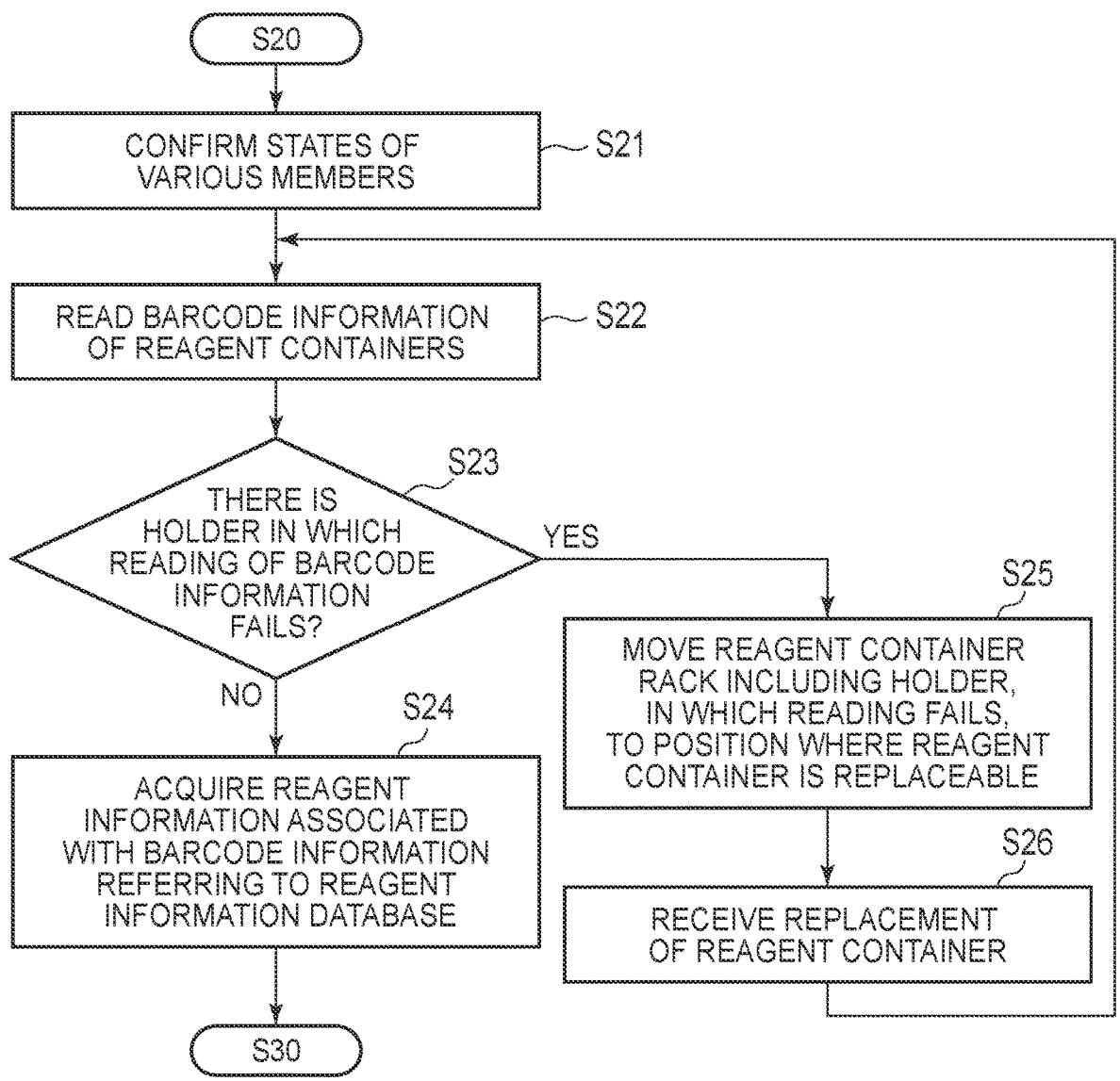
FIG. 7 is a flow diagram illustrating a sequence of processing in a reading step for barcode information.

FIG. 7 is a flowchart illustrating a sequence of processing in the barcode information reading step (S20). In S21, states of various members (the barcode reader 32c and the like) related to reading of barcode information are confirmed.

In S22, barcodes of the reagent container 442 are read. Specifically, the barcode reader 32c sequentially reads barcodes provided on the reagent container 442 or the reagent container rack 440a. In the example illustrated in FIG. 6, first, the barcode B on the right side is read and, subsequently, the barcode A is read. Consequently, the holder 441 on the right side and detailed information of a reagent stored in the reagent container 442 are associated. Subsequently, the barcode B on the left side is read and, subsequently, the barcode C is read. Consequently, the holder 441 on the left side and information indicating "no reagent container" are associated.

In S23, it is determined whether there is the holder 441 in which reading of barcode information fails. Specifically, it is determined whether, after reading the barcode B, the barcode reader 32c does not read both of the barcode A and the barcode C. For example, when the reagent container 442 turns away, both of the barcode A and the barcode C cannot be read. Therefore, the determination in S23 is YES. When the determination is NO, the processing shifts to S24. When the determination is YES, the processing shifts to S25.

In S24, reagent information associated with the barcode information is acquired with reference to the reagent information database. Specifically, the barcode reader 41 sends the acquired barcode information to the icon generating unit 54. The icon generating unit 54 acquires reagent information associated with the received barcode information referring to the reagent information database 36 stored in the analysis memory 33b.

In S25, the reagent table 440 is rotated to move the reagent container rack 440a including the holder 441, in which the reading fails, to a position where the reagent container 442 can be replaced. Consequently, the operator can replace the reagent container 442 held by the holder 441, in which the reading of the barcode information fails, and change the direction of the reagent container 442.

In S26, replacement of the reagent container 442 is received. This step can be, for example, a trigger for closing a lid (not illustrated in the figure) of the reagent table 440. After S26, the processing returns to S22 and reading of barcodes is performed again.

Note that, when it is determined YES in S23, rather than the shift to S25, position information included in the barcode B and information indicating "barcode reading error" may be associated and displayed as an icon.

[Selection Step for Icons]

A selection step for icons 700 is explained below with reference to FIG. 8 to FIG. 18B. Note that the explanation is based on transition of screens.

[Icons]

Figure 8:
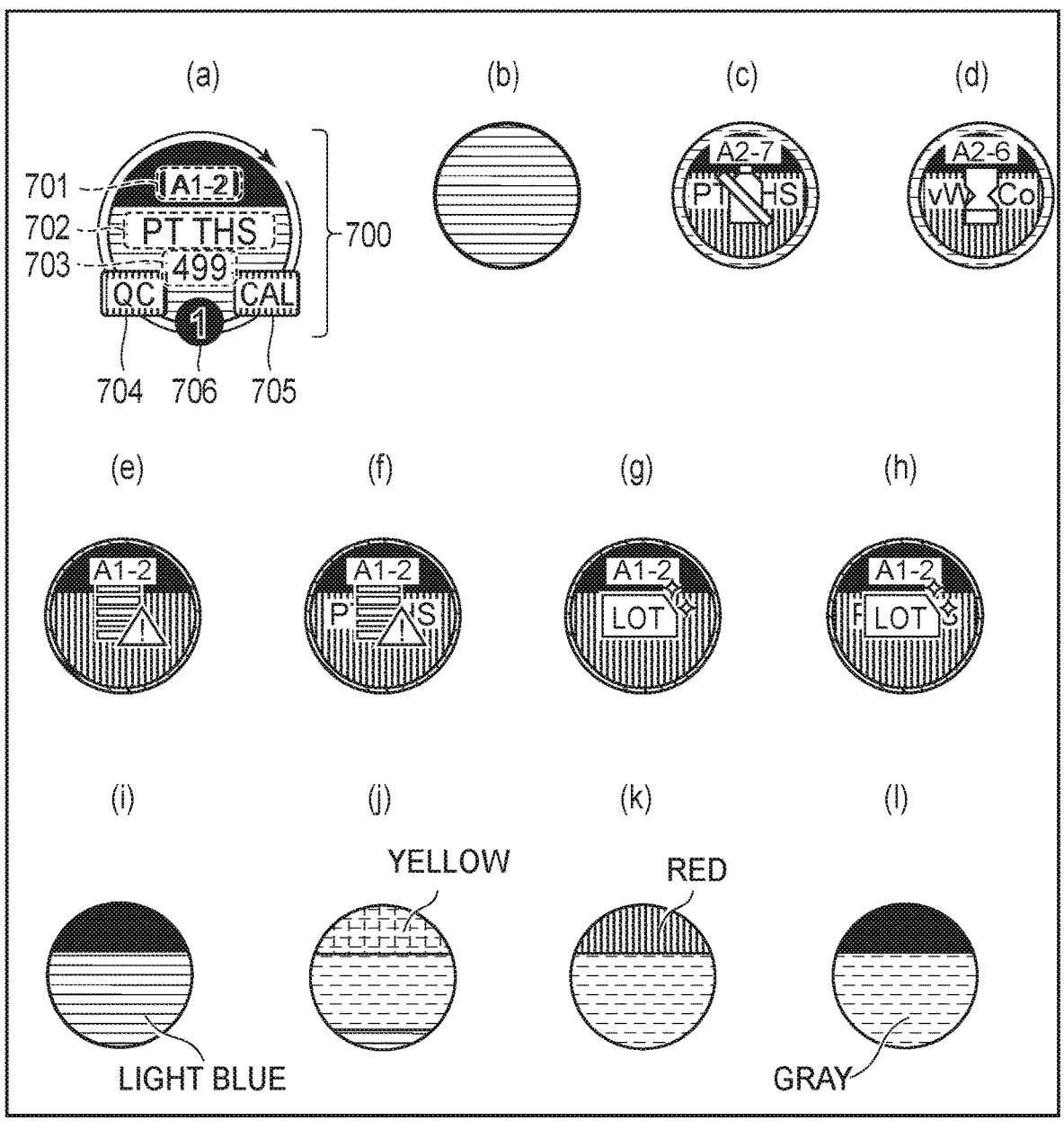
FIG. 8 is a diagram illustrating examples of reagent information included in icons.

(a) of FIG. 8 is a diagram illustrating an example of the icon 700 displayed on the display unit 33c. In the figure, the icon 700 includes a position display section 701 that displays the position of a reagent and a reagent-name display section 702 that displays a reagent name. The icon generating unit 54 determines a holder number displayed on the position display section 701 based on information read by the barcode reader 32c from the barcode B provided on the reagent container rack 440a. The icon generating unit 54 determines a reagent name displayed on the reagent-name display section 702 referring to barcode information read by the barcode reader 32c from the barcode C provided on the reagent container 442 and the reagent information database 36. Concerning icons representing diluting liquid or cleaning liquid, the position of the reagent and the reagent name can be displayed by the same method.

As other reagent information, in (a) of FIG. 8, an available number of times of use 703, an accuracy management warning 704, a calibration curve warning 705, and order of use of reagents 706 are displayed. The available number of times of use 703 is determined by a residual amount of a reagent and a measurement item and indicates how many times more measurement is possible. The accuracy management warning 704 indicates that accuracy management of a reagent is outside a reference value. The calibration curve warning 705 indicates that a calibration curve for a lot of a reagent is not created yet. The order of use of reagents 706 indicates in which order the reagents are used when the same reagents are arranged in the holders 441. Besides, although not illustrated in the figure, an elapsed time (unit: hour) from setting of a reagent and a residual amount of the reagent (unit: mL) may be displayed as the reagent information.

There is also reagent information displayed in a larger range. This is explained with reference to (b) to (i) of FIG. 8. (b) of FIG. 8 represents "no reagent" or "reagent exhausted", (c) of FIG. 8 represents "use prohibited", and (d) of FIG. 8 represents "expiration date of use expired". The icons 700 on which these kinds of reagent information are displayed cannot be selected in the selecting step. A reason for this is as explained below. The icon 700 on which "no reagent" is displayed indicates that a reagent is not arranged in the holder 441 associated with the icon 700. Therefore, no operation can be performed for the holder 441. The icon 700 on which "use prohibited" is displayed indicates that the size of a container of a reagent that should be arranged in the holder 441 is wrong (for example a small reagent container 442 is arranged in the holder 441 for setting a large reagent container 442). Therefore, no operation can be performed by the sample analyzer 30 unless the reagent container 442 is rearranged in a correct position. The icon 700 on which "expiration date of use expired" is displayed indicates that an expiration date of use of a reagent represented by the icon 700 has expired. Since it is not recommended to use the reagent, the expiration date of use of which has expired. Therefore, any operation by the sample analyzer 30 is prohibited by setting.

(e) of FIG. 8 is reagent information representing "barcode reading error (without previous reagent information)". (f) of FIG. 8 is reagent information representing the "barcode reading error (without previous reagent information)". (g) of FIG. 8 is reagent information representing "unregistered reagent". (h) of FIG. 8 is reagent information representing "unregistered reagent lot". These kinds of reagent information are reagent information displayed when the icon 700 illustrated in (a) of FIG. 8 cannot be displayed because reading of barcode information fails or information is not stored in the reagent information database 36.

The sample analyzer 30 recognizes the reagent containers 442 based on the information stored in the reagent information database 36. Therefore, concerning the reagent containers 442 associated with the icons 700 on which the reagent information illustrated in (e) to (h) of FIG. 8 is displayed, the sample analyzer 30 cannot recognize information on what kinds of reagents are stored, how much is residual amounts, and what calibration curves are like. As a result, the sample analyzer 30 cannot use, for a sample analysis, the reagent containers 442 associated with the icons 700 on which these kinds of reagent information are displayed.

The "barcode reading error (without previous reagent information)" is displayed when (i) a reagent barcode reader 350 cannot read information from the barcode A of the reagent container 442 and (ii) a reagent associated with the same holder 441 is not registered in the reagent information database 36. This example is an example where a reagent is arranged anew in the holder 441 in which a reagent was not arranged when the sample analyzer 30 was use last time and reading of the barcode A fails.

Concerning the reagent container 442 on which the icon 700 of the "barcode reading error (without previous reagent information)" is displayed, the operator can edit reagent information and register the reagent information in the reagent information database 36. According to this operation, the display of the icon 700 changes from the barcode reading error to display illustrated in (a) of FIG. 8. The analysis controller 33a recognizes the reagent container 442 associated with the icon 700 based on reagent information registered in the reagent information database 36 anew. As a result, the sample analyzer 30 can use, for an analysis of a sample, the reagent container 442 associated with the icon 700. Concerning a sequence of specific processing in editing the reagent information, please refer to a section of [Example 2] explained below.

The "barcode reading error (with previous reagent information)" is displayed when (i) the barcode reader 32c cannot read information from the barcode A of the reagent container 442 and (ii) a reagent associated with the same holder 441 is registered in the reagent information database 36. For example, this example is an example where the same reagent is arranged in a holder in which the reagent was arranged when the sample analyzer 30 was used last time but reading of the barcode A fails. Concerning the icon 700 on which the "barcode reading error (with previous reagent information)" is displayed, the operator (i) can edit reagent information and (ii) can restore, based on position information of the holder 441 associated with the icon 700, the reagent information referring to the reagent information database 36.

If the reagent information is edited and registered in the reagent information database 36, as explained above, the sample analyzer 30 can use, for an analysis of a sample, the reagent container 442 associated with the icon 700. On the other hand, if the reagent information is restored, the analysis controller 33a acquires, from the reagent information database 36, information for recognizing the reagent container 442 associated with the icon 700. As a result, the sample analyzer 30 can use, for an analysis of a sample, the reagent container 442 associated with the icon 700. Concerning a sequence of specific processing in restoring the reagent information, please refer to a section of [Example 3] explained below.

The "unregistered reagent" is displayed when the barcode reader 32c reads information from the barcode A of the reagent container 442 but a reagent name is not registered in the reagent information database 36. Concerning the icon 700 on which the "unregistered reagent" is displayed, the operator can edit reagent information. The "unregistered reagent lot" is displayed when the barcode reader 32c reads information from the barcode A of the reagent container 442 but a lot is not registered in the reagent information database 36. Concerning the icon 700 on which the "unregistered reagent lot" is displayed, the operator can edit reagent information. If the reagent information is edited and registered in the reagent information database 36, as explained above, the sample analyzer 30 can use, for an analysis of a sample, the reagent container 442 associated with the icon 700.

(i) of FIG. 8 represents "residual amount present", (j) of FIG. 8 represents "residual amount warning", (k) represents "reagent exhausted" or "no reagent", and (l) represents "residual amount unknown". All of these are reagent information on a residual amount of a reagent. The "residual amount present" is usually displayed. The "residual amount warning" is displayed when the residual amount of the reagent is equal to or smaller than a predetermined threshold. The "no residual amount" is displayed when there is no residual amount. The "residual amount unknown" is displayed when the residual amount is unknown. Concerning the icons on which these kinds of reagent information are displayed, the operator can cause the sample analyzer 30 to perform measurement of a residual amount.

By performing the measurement of a residual amount, the analysis controller 33a can grasp accurate amounts of reagents stored in the reagent containers 442 associated with the icons 700. When an amount of a reagent is smaller than a predetermined threshold, the analysis controller 33a may urge the operator to supply the reagent (for example, by changing reagent information displayed on the icon 700). The analysis controller 33a may operate the measuring unit 32 to receive the supply of the reagent (for example, by rotating the reagent table 440 to a predetermined position). If the operator supplies the reagent, it is possible to avoid a situation in which a residual amount of the reagent from becoming insufficient halfway in a continuous analysis and efficiently operate the sample analyzer 30.

[Categories of Reagent Information]

A table summarizing what the operator can perform concerning the reagent information illustrated in (e) to (l) of FIG. 8 is FIG. 9. In the table of FIG. 9, "categories" are set for the respective kinds of reagent information. One or more kinds of reagent information are classified into one category.

States of the reagents represented by the reagent information classified into the same category at least partially have a common term. In an embodiment, the common term means that the operator can perform the same operation for the reagents. For example, the "unregistered reagent" and the "unregistered reagent lot" are common in that "information can be read from the barcode A of the reagent container 442 but a part of reagent information (a reagent name or a reagent lot) is not registered in the reagent information database 36" and are also common in that an operation of "editing the reagent information" is possible. Similarly, the "residual amount present", the "residual amount warning", the "reagent exhausted", and the "residual amount unknown" are common in that "information can be read from the barcode A of the reagent container 442 and reagent information can be acquired from the reagent information database" and are also common in that "measurement of a residual amount" or "reset of a residual amount" is possible.

However, the categorization of the reagent information illustrated in FIG. 9 is an example. Other categories may be set as appropriate according to a purpose. For example, the "residual amount present", the "residual amount warning", the "reagent exhausted", and the "residual amount unknown" may be respectively set as different categories.

In an embodiment, a related icon 700 that can be selected after one icon 700 is selected (or an icon 700 selected together when one icon 700 is selected) is "an icon in the same category as the selected one icon 700". That is, a state of a reagent represented by the selected one icon 700 and a state of the reagent represented by the related icon 700 are common at least in a part.

When the categories are set as illustrated in FIG. 9, in an example, any one of the "residual amount present", the "residual amount warning", the "reagent exhausted", and the "residual amount unknown" may be displayed on the selected one icon 700 and the related icon 700. In this case, the operator can perform residual amount measurement for reagents represented by icons 700 on which any one of the "residual amount present", the "residual amount warning", the "reagent exhausted", and the "residual amount unknown" is displayed.

In an example, the "barcode reading error (without previous reagent information)" may be displayed on both of the selected one icon 700 and the related icon 700. In this case, the operator can collectively perform editing of reagent information for the reagent containers 442 associated with the icons 700 on which the "barcode reading error (without previous reagent information)" is displayed. In another example, the "barcode reading error (with previous reagent information)" may be displayed on both of the selected one icon 700 and the related icon 700. In this case, the operator can collectively perform editing of reagent information or can collectively perform restoration of reagent information for the reagent containers 442 associated with the icons 700 on which the "barcode reading error (with previous reagent information)" is displayed. Further, in still another example, one of the "barcode reading error (without previous reagent information)" and the "barcode reading error (with previous reagent information)" may be displayed on the selected one icon 700 and the related icon 700. In this case, the operator can collectively perform editing of reagent information for the reagent containers 442 associated with the icons 700 on which one of the "barcode reading error (without previous reagent information)" and the "barcode reading error (with previous reagent information)" is displayed.

In an example, one of the "unregistered reagent" and the "unregistered reagent lot" may be displayed on the selected one icon 700 and the related icon 700. In this case, the operator can collectively perform, for example, editing of reagent information for the reagent container 442 associated with the icon 700 on which the one of the "unregistered reagent" and the "unregistered reagent lot" is displayed.

In an example, the selected one icon 700 and the related icon 700 may represent reagents, information of each of which is read from the barcode A of the reagent container 442, and an expiration date of each of which is yet to expire (in the classification illustrated in FIG. 9, they are the icons 700 on which the "residual amount present", the "residual amount warning", the "reagent exhausted", and the "residual amount unknown" are displayed). In this case, for reagents represented by the icons 700 on which any one of the "residual amount present", the "residual amount warning", the "reagent exhausted", and the "residual amount unknown" is displayed, for example, the operator can cause the sample analyzer 30 to collectively perform residual amount measurement, to collectively create a calibration curve, and to collectively perform accuracy management.

[Reagent Management Screen]

Figure 10:
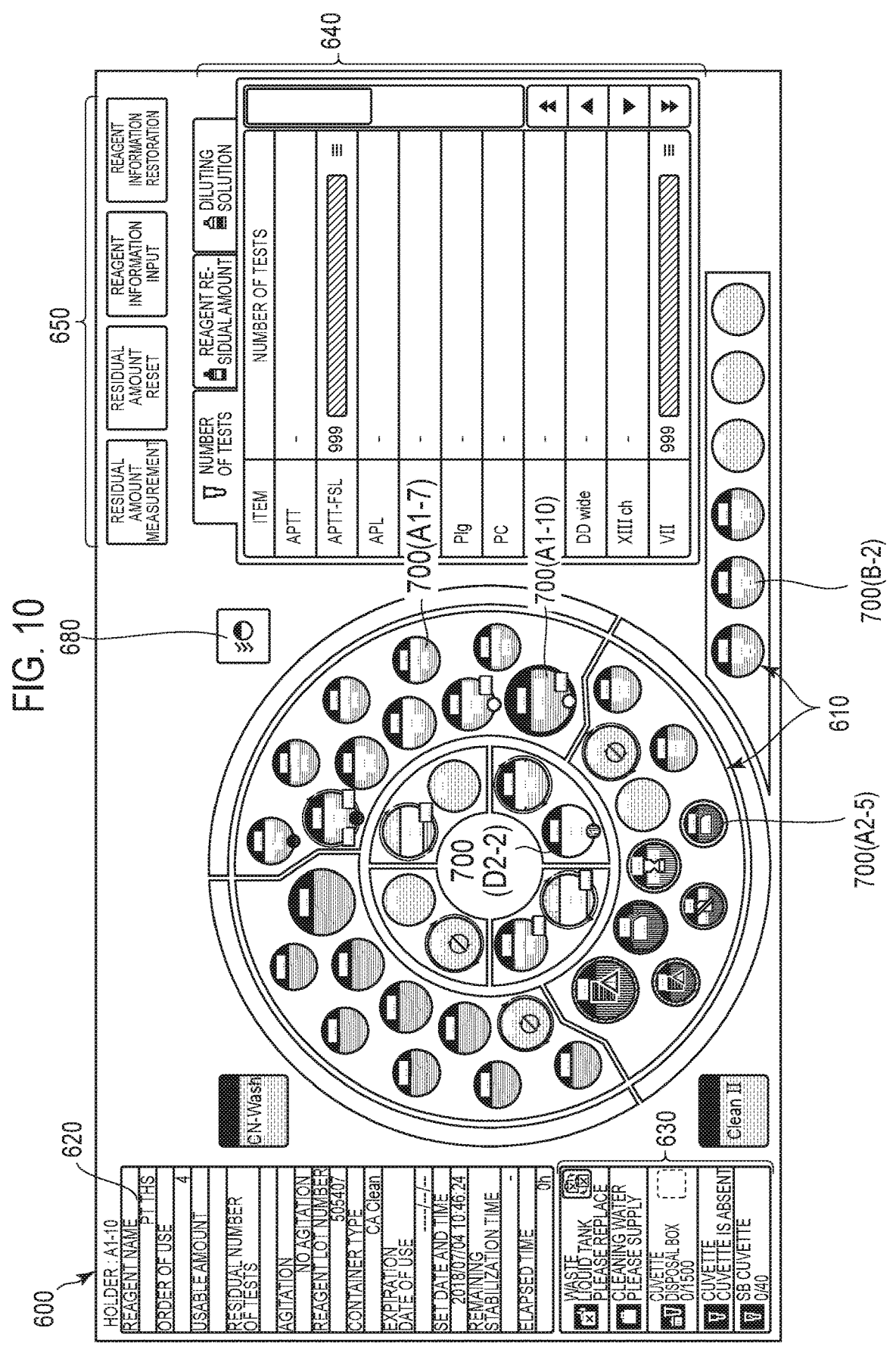

FIG. 10 is an overall diagram of a reagent management screen 600. The reagent management screen 600 includes a reagent arrangement display region 610, a holder information display region 620, an expendable information display region 630, a list information display region 640, an operation instruction region 650, and a mode switching section 680. The display unit 33c has a touch panel function. Therefore, the operator can perform selection or operation by directly touching buttons and the like displayed on the reagent management screen 600.

In FIG. 10, screen design is adopted in which arrangement of the icons 700 are associated with arrangement of reagents in the holders 441 of the sample analyzer 30. In the figure, thirty-eight icons 700 are arranged corresponding to an arrangement state of reagents arranged on the reagent table 440. Further, six icons 700 are arranged corresponding to an arrangement state of diluting liquids or cleaning liquids in the reagent arrangement display region 610 present in a lower part of the reagent management screen 600. Note that, when a reagent is not arranged in the holder 441, the icon 700 including reagent information of "no reagent" is displayed.

These icons 700 can be selected by a selection operation (tap by a finger, click by a mouse, or the like). In FIG. 10, the icon 700 of A1-10 is displayed distinguishably as the selected icon. The icon 700 (A1-10) is surrounded by a thick frame (in the following drawings, in order to distinguish the icons 700, holder names of the associated holders 441 are sometimes written in parentheses).

As explained above, various kinds of reagent information are displayed on the icons 700. For example, in FIG. 10, all of the icon 700 (A1-10), the icon 700 (A1-7), and the icon 700 (D2-2) represent reagents used for a sample analysis. However, residual amounts of the reagents are different. The icon 700 (B-2) represents diluting liquid. The icon 700 (A2-5) represents arrangement of an unregistered reagent.

In the reagent arrangement display region 610, the icon 700 representing a reagent arranged in the holder 441 is displayed. Information on a reagent arranged in the holder 441 associated with the icon 700 in the selected state is displayed. Examples of such information include a holder number, a reagent name, order of use, a usable residual amount (a usable amount), the number of residual tests, presence or absence of agitation, a lot number, a type of a reagent container, an expiration date of use for the reagent, a set date, a set time, and an elapsed time. Stock amounts of cleaning water and cuvettes, residual capacities of a waste liquid tank and a used cuvette waste box, and the like are displayed in the expendable information display region 630. A remaining number of times (determined by, for example, a residual amount of a reagent) of a test that can be executed, a residual amount of a reagent, a residual amount of the diluting liquid, and the like are displayed in the list information display region 640 by tubs. The operation instruction region 650 includes buttons for instructing the sample analyzer 30 to perform predetermined operations for a reagent represented by a selected icon. In FIG. 10, four kinds of buttons, that is, a "residual amount measurement" button, a "residual amount reset" button, a "reagent information input" button, and a "reagent information restoration" button are illustrated. When the operator taps the buttons, the kinds of operations described on the respective buttons are performed for a reagent represented by the icon 700 in the selected state. The mode switching section 680 switches a mode of the reagent management screen 600. What is particularly important is switching between a "normal selection mode" and a "plural selection mode". The modes are explained in detail in first to third embodiments.

First Embodiment

A display method according to a first embodiment is explained below with reference to FIG. 1. In a first embodiment, reagents are selected in the plural selection mode.

First, the operator taps the mode switching section 680 to switch the mode of the reagent management screen 600 to the plural selection mode (FIG. 11A). Please take note that a checkbox of the mode switching section 680 is checked. The icons 700 can be selected on a display screen of the plural selection mode.

A display screen at the time when the icon 700 (A1-10) is selected from a state of FIG. 11A is illustrated in FIG. 11B. In a first embodiment, the operator selects the icon 700 (A1-10) by tapping. At this time, an icon 700 (A1-8) and an icon 700 (A1-2), which are icons (second reagent icons) of reagents related to reagent information included in the selected icon 700 (A1-10), are displayed bright. On the other hand, the other icons 700 are displayed dark. Consequently, the icon 700 (A1-10) and the icons 700 (A1-2) and 700 (A1-8) of the related reagents are displayed distinguishably or in a distinguishable manner from the other icons 700.

That is, in FIG. 11B, (i) the icon 700 (A1-10) selected first is displayed distinguishably as the selected icon and (ii) the icons 700 (A1-2) and 700 (A1-8), which are the icons of the reagents related to the reagent information included in the icon 700 (A1-10), are displayed distinguishably as selectable icons.

Note that, in FIG. 11B, icons "having the same reagent names" are set as "icon of related reagents". However, a method of selecting icons of related reagents is not limited to this (the same applies in other embodiments).

A display screen at the time when the icon 700 (A1-8) is selected from the state of FIG. 11B is illustrated in FIG. 11C. At this time, an additionally selected icon 700 (A1-8) is also in a selected state (please take note that the periphery of the icon 700 (A1-8) is a thick frame). Two icons including the additionally selected icon 700 (A1-8) and the icon 700 (A1-10) selected first are in a selected state. On the other hand, the icon 700 (A1-2) that is in a selectable state but is not selected by the operator is not in a selected state.

That is, in FIG. 11C, the icon 700 (A1-8) displayed distinguishably as the selectable icon in FIG. 11B is selected and displayed distinguishably as the selected icon.

Reference Example

As a reference example, operations in a mode (hereinafter referred to as "normal selection mode") other than the plural selection mode are explained with reference to FIG. 12A and FIG. 12B. In this reference example, please take note that the checkbox of the mode switching section 680 is not checked.

FIG. 12A is a diagram illustrating a state where the icon 700 (A1-10) is selected in the normal selection mode. Please take note that the periphery of the icon 700 (A1-10) is a thick frame. The peripheries of icons other than the icon 700 (A1-10) are neither displayed bright nor displayed dark. That is, icons of related reagents are not distinguishably displayed.

A display screen at the time when the icon 700 (A1-8) is selected from the state of FIG. 12A is illustrated in FIG. 12B. At this time, whereas the icon 700 (A1-8) is in a selected state, the icon 700 (A1-10) is not in a selected state. That is, even if another icon 700 is selected in a state where a certain icon 700 is selected, the icon in a selected state is only changed and icons cannot be selected.

Second Embodiment

Figure 13B:
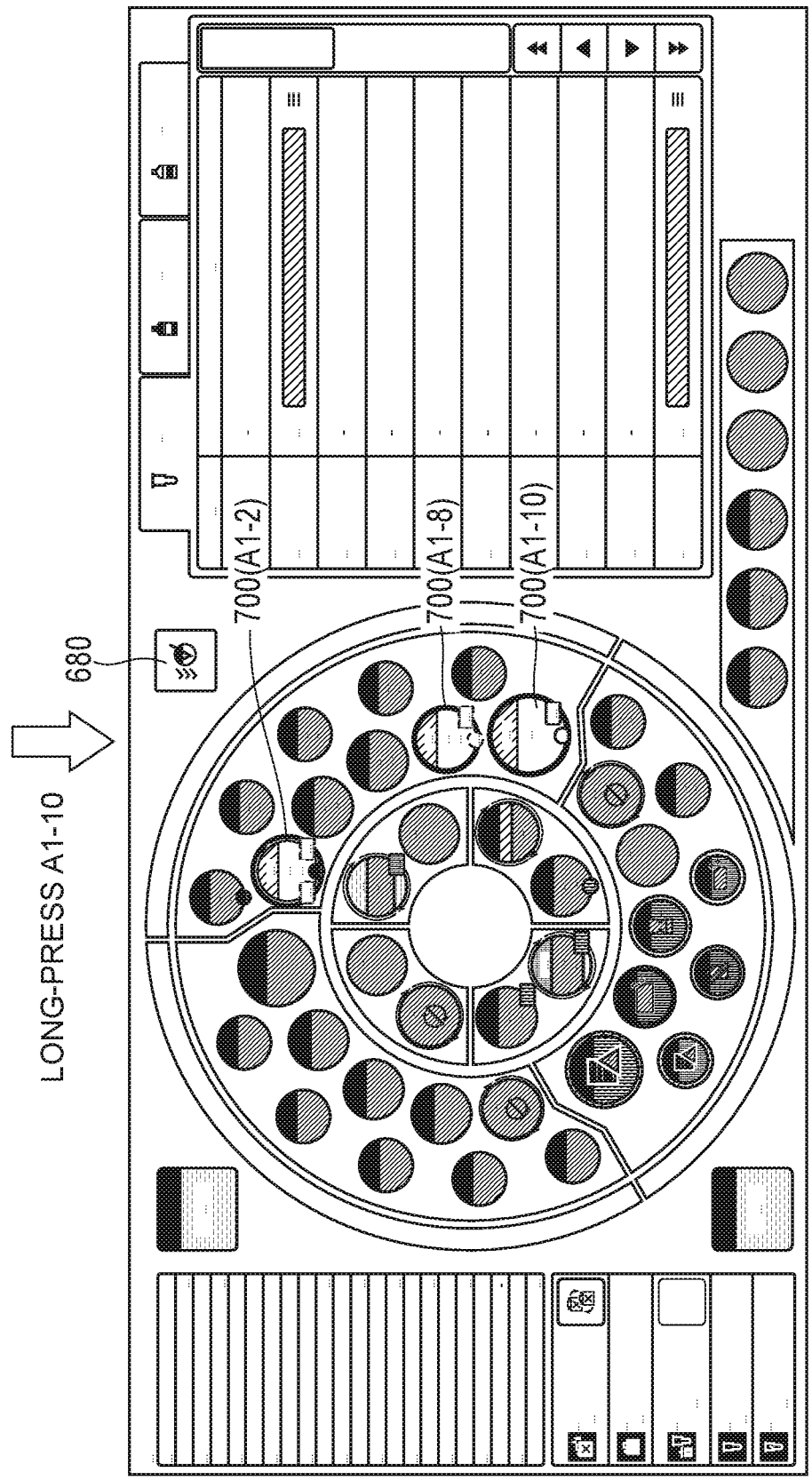

A display method according to a second embodiment is explained with reference to FIG. 13A and FIG. 13B. In a second embodiment, reagents are collectively selected in the plural selection mode. FIG. 13A is diagram illustrating a state where an operator taps the mode switching section 680 to switch the mode of the reagent management screen 600 to the plural selection mode (that is, the same state as FIG. 13A).

A display screen at the time when the icon 700 (A1-10) is selected from the state of FIG. 13A is illustrated in FIG. 13B. In a second embodiment, the operator selects the icon 700 (A1-10) with long-press. At this time, the icons 700 (A1-2) and 700 (A1-8) of related reagents are also in a selected state in addition to the icon 700 (A1-10) selected by the operator. That is, it is possible to collectively set the selected icon 700 (A1-10) and the icons 700 (A1-2) and 700 (A1-8) of the related reagents in a selected state without requiring an additional tap operation as in a first embodiment.

That is, in FIG. 13B, all of the icons 700 (A1-2), 700 (A1-8), and 700 (A1-10) are in a selected state and are displayed distinguishably as the selected icons.

Third Embodiment

A display method according to a third embodiment is explained below with reference to FIG. 14A and FIG. 14B. In a third embodiment, switching from the normal selection mode to the plural selection mode and collective selection of reagents are performed by the same operation. FIG. 14A is a diagram illustrating a state where an operator taps the mode switching section 680 to switch the mode of the reagent management screen 600 to the normal selection mode.

A display screen at the time when the icon 700 (A1-10) is selected from the state of FIG. 14A is illustrated in FIG. 14B. In a third embodiment, the operator selects the icon 700 (A1-10) with long-press. At this time, the selected icon 700 (A1-10) and the icons 700 (A1-2) and 700 (A1-8) of related reagents are collectively selected. The selection modes are switched and the mode switching section 680 is checked.

[Modification 1]

Figure 15C:
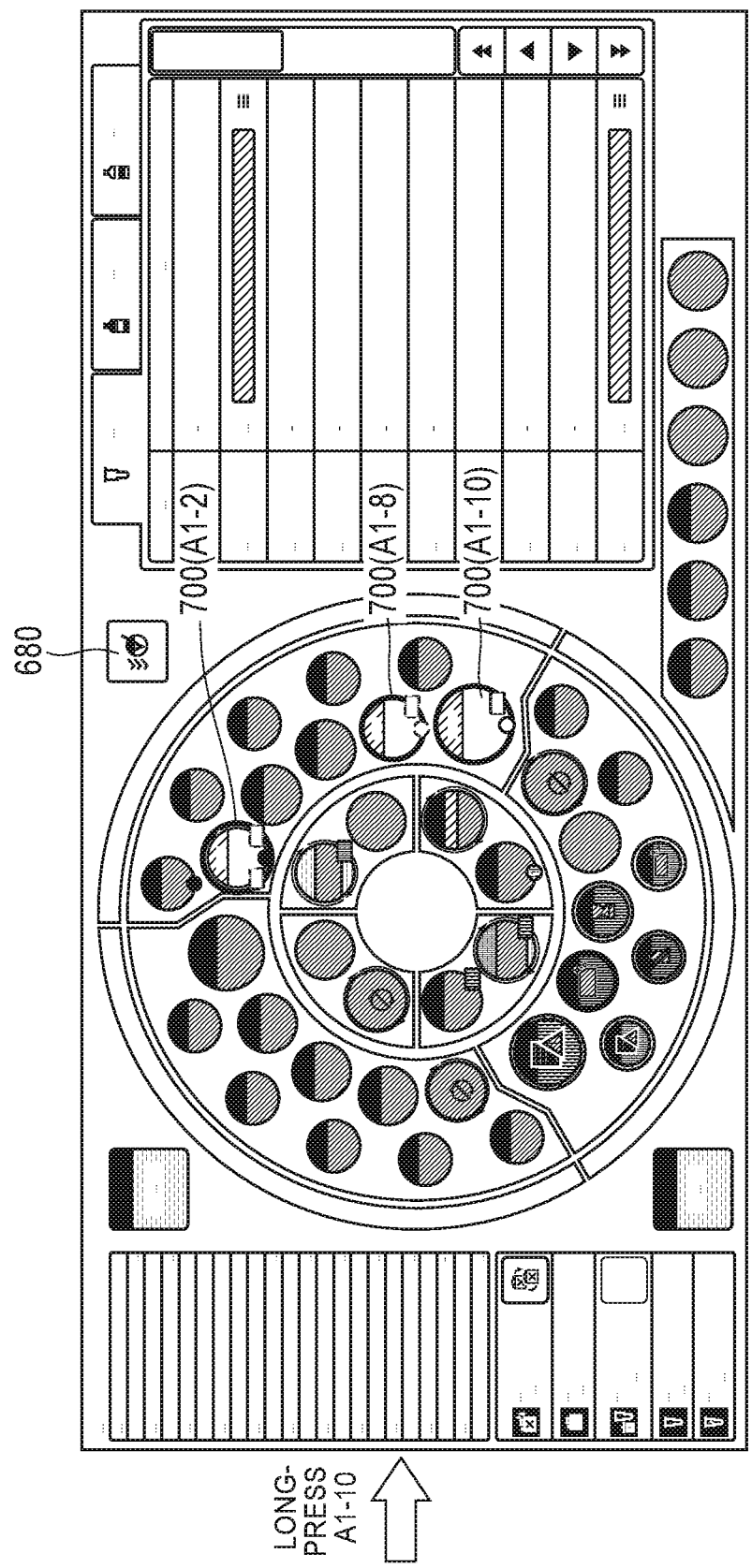

A first embodiment and a second embodiment may be combined, and a first embodiment and a third embodiment may be combined (see FIG. 15A, FIG. 15B and FIG. 15C). In this modification, the analysis controller 33a provides a predetermined threshold for a time for touching a touch panel and distinguishes tap (first selecting means) and long-press (second selecting means). In response to selection by the tap (the first selecting means), the analysis controller 33a sets the selected icon 700 (A1-10) in a selected state and sets the icons 700 (A1-2) and 700 (A1-8) of the related reagents in a selectable state. On the other hand, in response to selection by the long-press (the second selecting means), the analysis controller 33a sets the selected icon 700 (A1-10) and the icons 700 (A1-2) and 700 (A1-8) of the related reagents in a selected state.

[Modification 2]

Figure 16A:
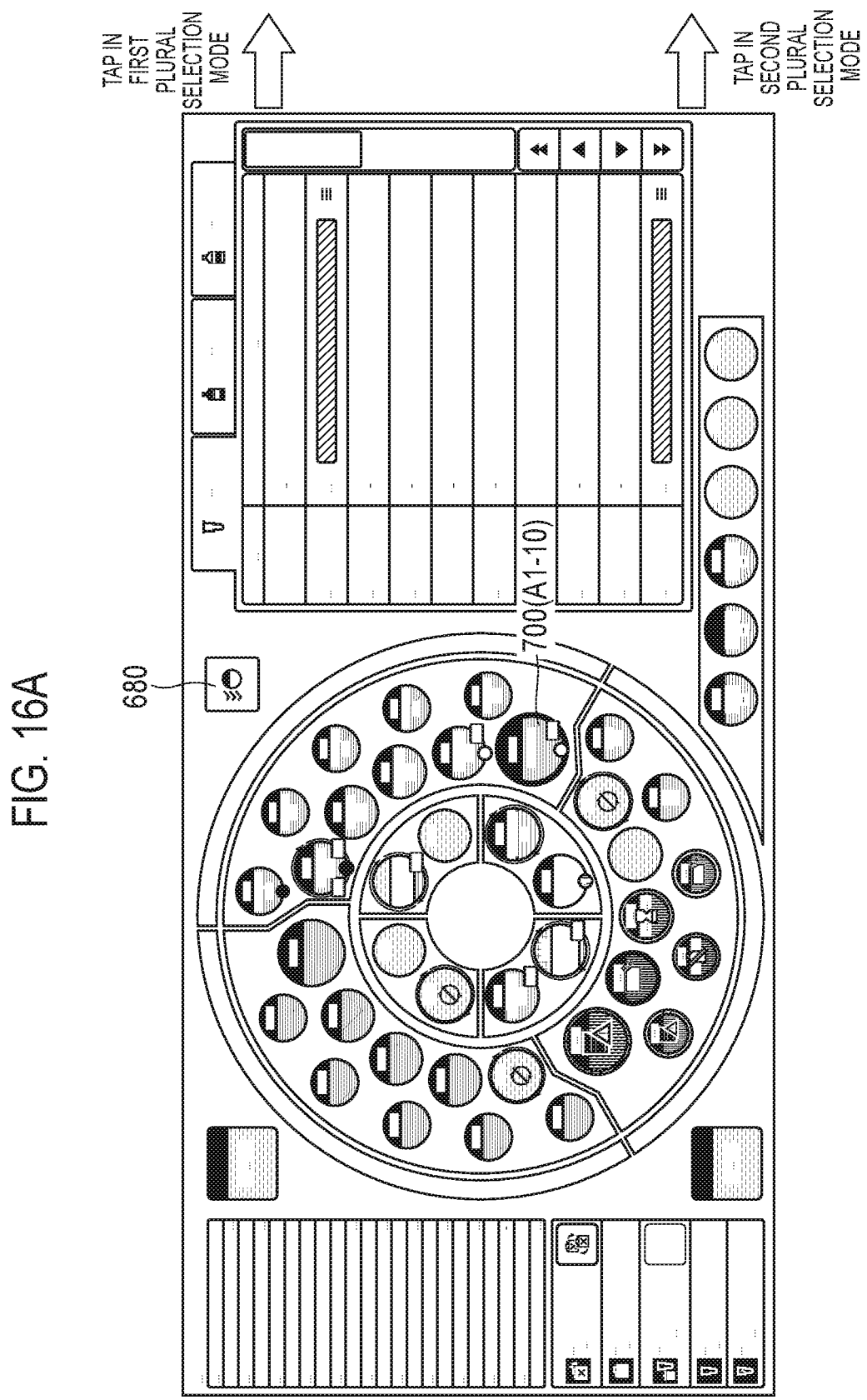
Figure 16C:
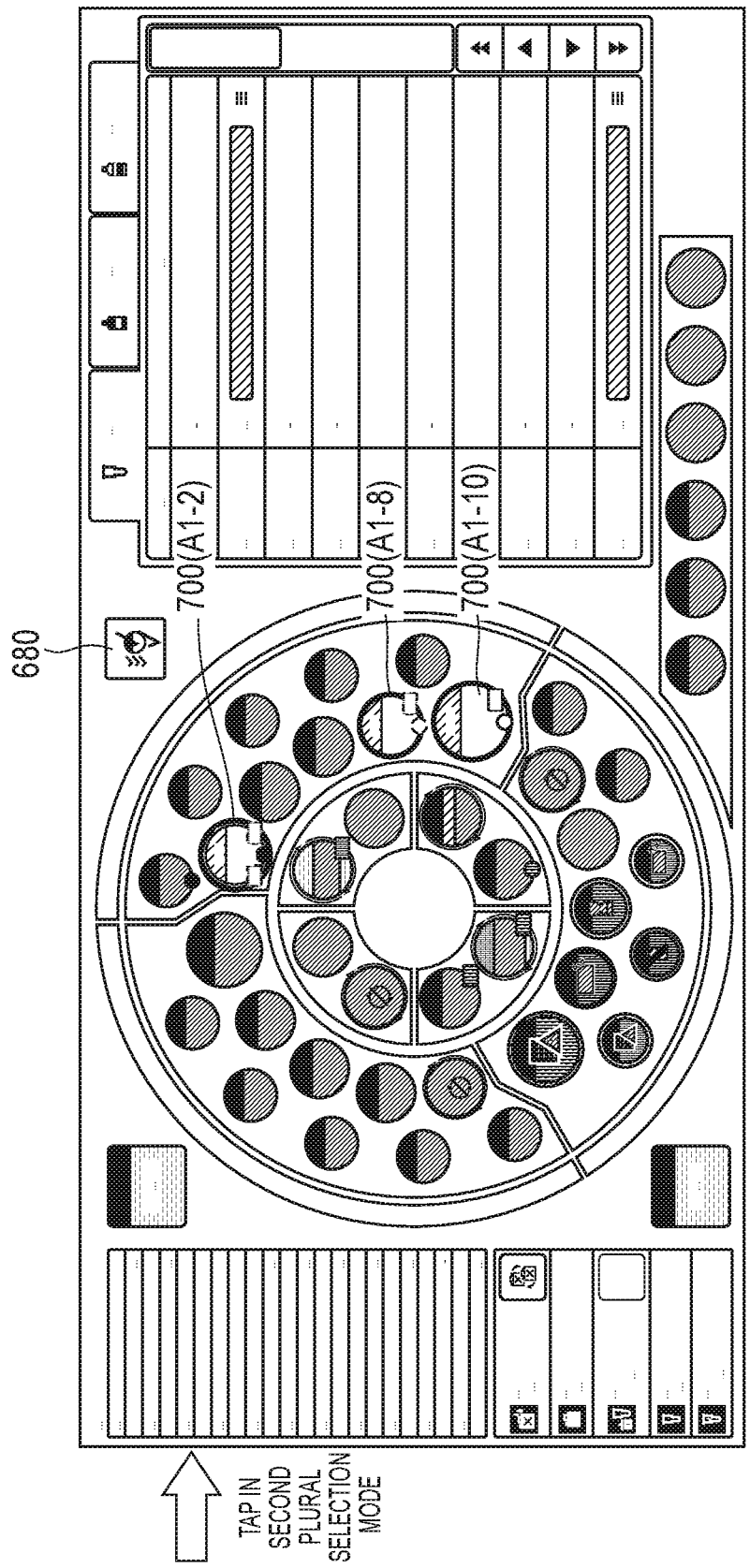

The analysis controller 33a may prepare two kinds of plural selection modes to thereby switch whether collective selection is performed (see FIG. 16A, FIG. 16B and FIG. 16C). That is, in a first plural selection mode, in response to selection (tap) of the icon 700 (A1-10), the analysis controller 33a sets the selected icon 700 (A1-10) in a selected state and sets the icons 700 (A1-2) and 700 (A1-8) of the related reagents in a selectable state. On the other hand, in a second plural selection mode, in response to selection (tap) of the icon 700 (A1-10), the analysis controller 33a sets the selected icon 700 (A1-10) and the icons 700 (A1-2) and 700 (A1-8) of the related reagents in a selected state. A difference from the modification 1 is that it is unnecessary to prepare the selecting means.

[Modification 3]

In embodiments and the modifications explained above, a method of releasing a selected state of the icons 700 may be provided.

(Modification 3-1)

Figure 17B:
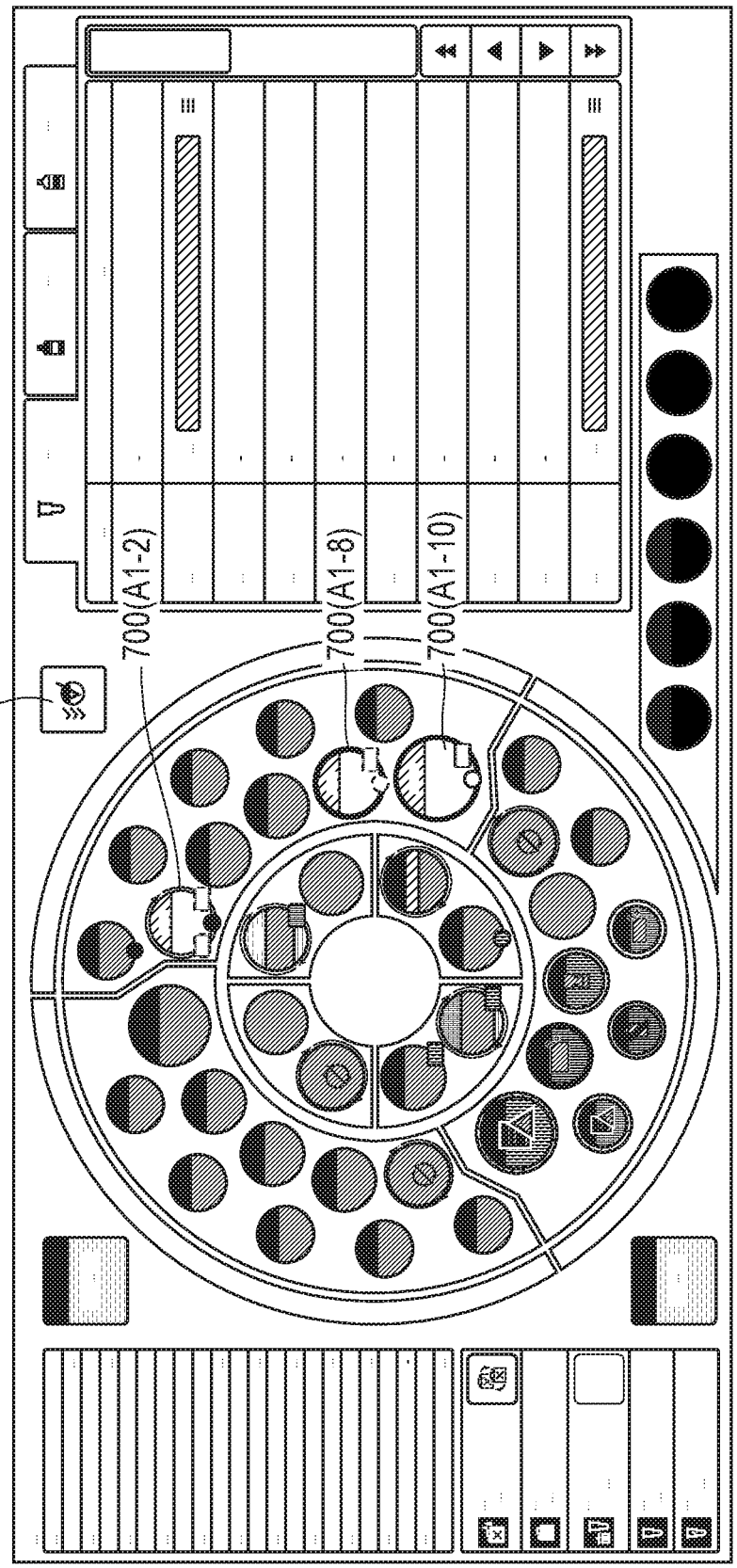

As an example of such a method, in FIG. 17A and FIG. 17B, a method of selecting an icon in a selected state again is illustrated. In (a), the icons 700 (A1-2), 700 (A1-8), and 700 (A1-10) are selected. In (b), by selecting the icon 700 (A1-2), the selected state changes to a state where only the icons 700 (A1-8) and 700 (A1-10) are selected. Selecting means in releasing the selected state of the icons 700 may be the same as or may be different from the selecting means in selecting the icons 700. For example, when the icons 700 are selected by one tap, design for releasing the selected state with the one tap as well may be adopted or design for releasing the selected state with double tap may be adopted.

(Modification 3-2)

Figure 18B:
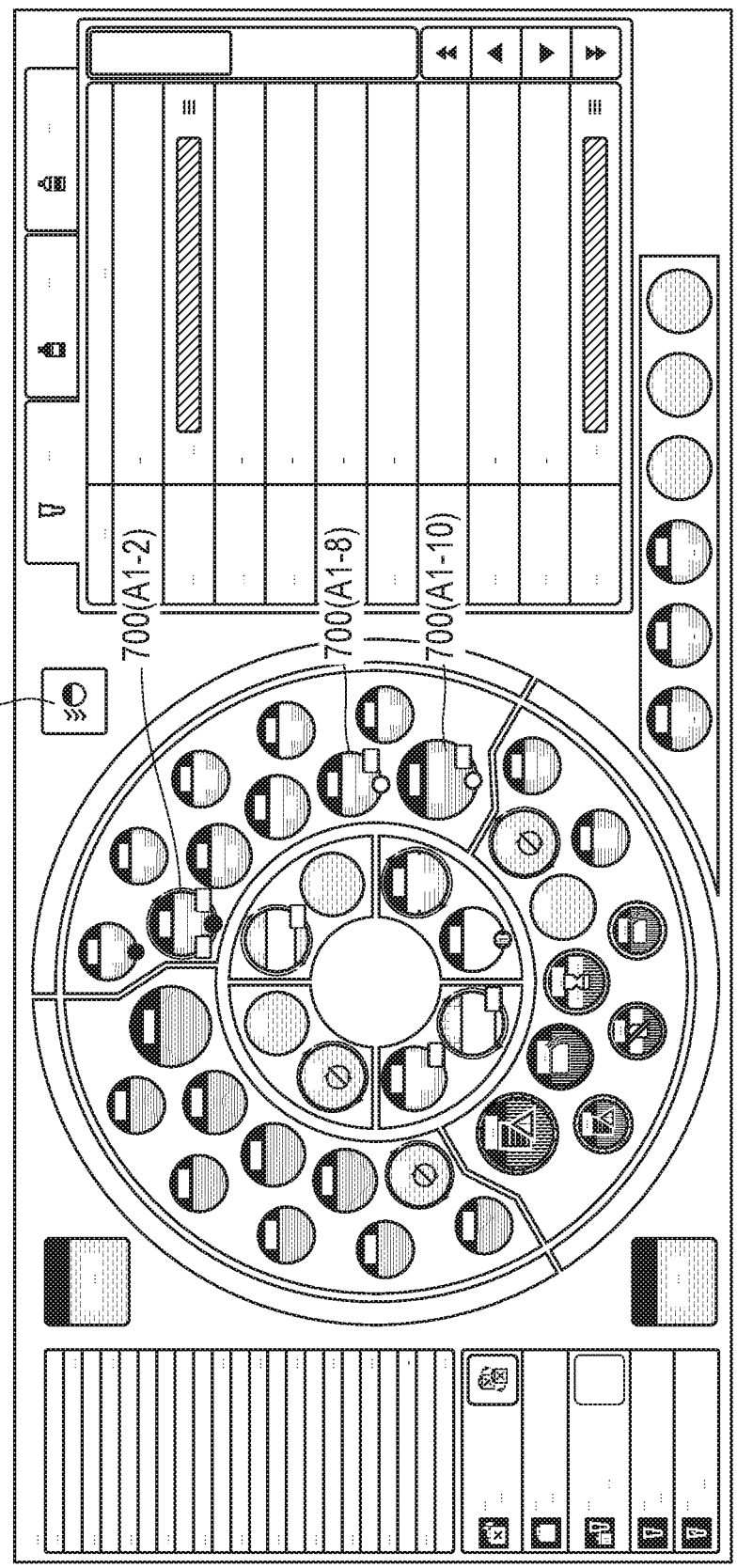

As another method of releasing the selected state of the icon 700, in FIG. 18A and FIG. 18B, a method of switching the mode from the plural selection mode to a mode other than the plural selection mode is illustrated. In (a), the icons 700 (A1-8) and 700 (A1-10) are selected and the icon 700 (A1-2) is in a selectable state. In (b), by switching the plural selection mode to the normal selection mode, the selected state changes to a state where all the icons are not selected. Note that, when the mode is switched from the plural selection mode to the normal selection mode, the selected state of at least one icon 700 only has to be released.

[Predetermined Operation Process]

Figure 4:
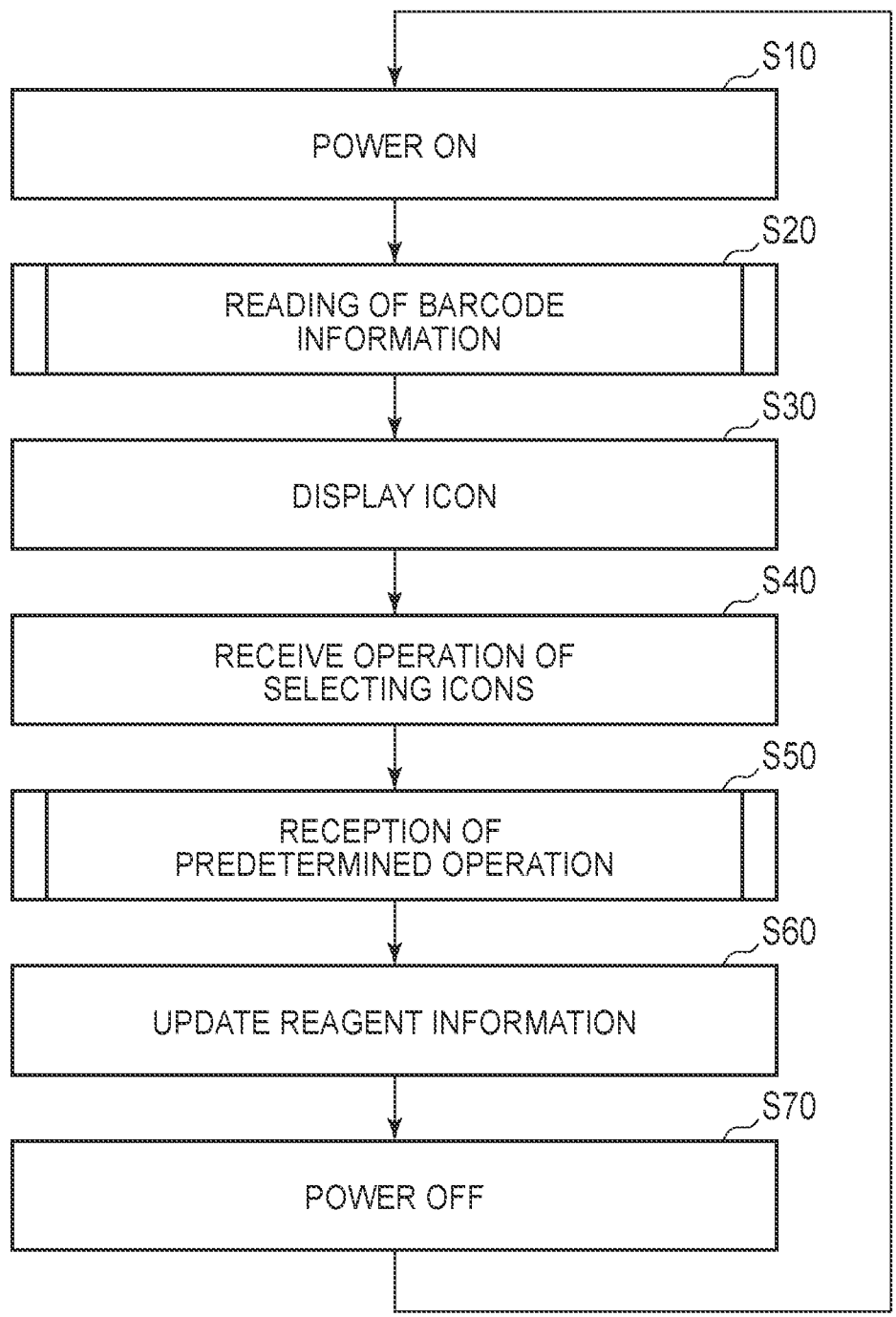
FIG. 4 is a flow diagram illustrating a sequence of processing in a display method according to an embodiment.

In the following explanation, the "predetermined operations" performed in S50 in FIG. 4 are explained with reference to typical three examples.

Example 1: Residual Amount Measurement of Reagents

Example 1 is an example in which measurement of residual amounts is performed for reagents represented by the selected icons 700. According to the categories illustrated in FIG. 9, this operation is executable on the icons including the reagent information of the "residual amount present", the "residual amount warning", the "no residual amount", and the "residual amount unknown". As explained above, for efficient measurement, before performing continuous measurement using the sample analyzer 30, it is necessary to confirm whether sufficient reagents necessary for planned measurement are present.

Most of reagents used in analyzing coagulation and fibrinolysis functions of blood are not a cartridge type and are encapsulated in a vial. Therefore, reagents of the same type and the same lot can be collected in one vial and used. For example, an operation of, after finishing using the sample analyzer 30, transferring two reagents used to approximately a half of a capacity to one vial, and preparing for the next use is performed in a site. In this case, residual amounts of the reagents immediately before the end of the use of the sample analyzer 30 are stored in the reagent information database 36. However, it is unknown that the reagents are manually added by the operator thereafter.

Under such circumstances, measurement of residual amounts is important before the continuous measurement by the sample analyzer 30 is started. Reagents (reagents, reagent names and lots of which are known) can be selected on the reagent management screen 600 displayed by the sample analyzer 30. Therefore, the reagents can be collectively served for residual amount measurement. It is possible to urge the operator to supply necessary reagents by informing a measurement result of residual amounts to the operator.

A sequence of processing at the time when, after the icons 700 are selected, residual amounts of reagents represented by the icons 700 is explained with reference to FIG. 19.

In S51a, input of residual amount measurement is received. In this step, tap of a button of "residual amount measurement" in the operation instruction region 650 by the operator is set as a trigger.

In S52a, a liquid surface of a reagent stored in the reagent container 442 is detected. Specifically, the nozzle 451 (461) of the reagent dispensing unit 450 (460) moves downward from an initial position (height H1) for aspirating the reagent. The nozzle 451 (461) is driven by a stepping motor and moves by a moving distance D every time one pulse is input to the stepping motor. A sensor is provided at the distal end of the nozzle 451 (461). The liquid surface of the reagent is detected by the sensor. At the same time, a pulse number P at the time when the sensor detects the liquid surface of the reagent is acquired by the measurement controller 32a.

Figure 20:
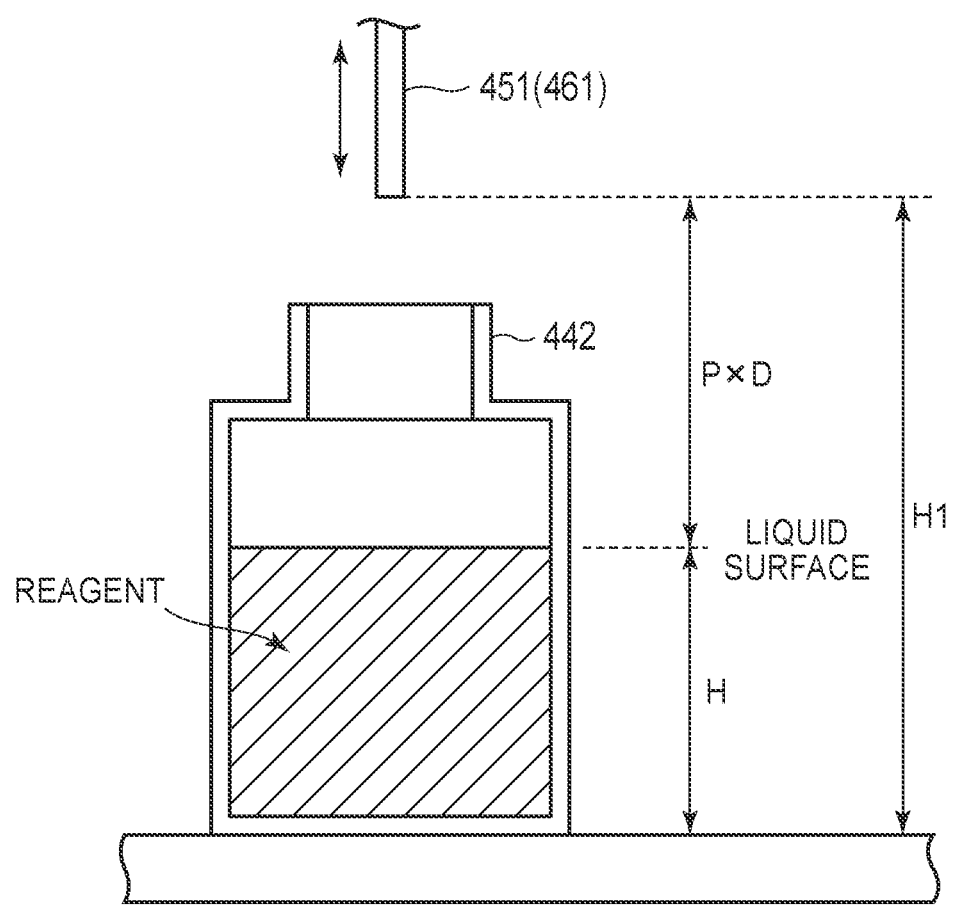
FIG. 20 is a diagram schematically illustrating a state where height of a liquid surface of a reagent in a reagent container is calculated.

In S53a, the analysis controller 33a calculates height of the liquid surface (see FIG. 20). Specifically, the analysis controller 33a receives the pulse number P from the measurement controller 32a. Thereafter, the analysis controller 33a calculates height H of the liquid surface according to the following Expression (1) (note that H1 and D are given values and stored in the analysis memory 33b).

$$H(\text{the height of the liquid surface}) = H1(\text{the height of an initial position}) - P(\text{the pulse number}) \times D(\text{a moving distance of one pulse}) \quad (1)$$

In S54a, the analysis controller 33a calculates a residual amount of the reagent from a type of a container and the height of the liquid surface. Specifically, the analysis controller 33a acquires an inner area S in the horizontal direction of the reagent container 442 from the reagent information database 36. Subsequently, the analysis controller 33a calculates a residual amount T of the reagent according to the following Expression (2).

$$T(\text{the residual amount}) = H(\text{the height of the liquid surface}) \times S(\text{the inner area of the reagent container}) \quad (2)$$

In S55a, the analysis controller 33a stores the calculated reagent residual amount T in the reagent information database 36. When data of a reagent residual amount is already stored in the reagent information database, the data is deleted. The reagent residual amount T calculated in steps S51a to S54a is stored anew.

Example 2: Collective Editing of Reagent Information

Example 2 is an example in which the reagent information of the reagents represented by the selected icons 700 is edited. According to the categories illustrated in FIG. 9, this operation is executable for the icons including the reagent information of the "barcode reading error (without previous reagent information)", the "barcode reading error (with previous reagent information)", the "unregistered reagent", and the "unregistered reagent lot". For example, this example is useful when there are reagents, lots of which are unregistered, and all the reagents are of the same lot.

Figure 21:
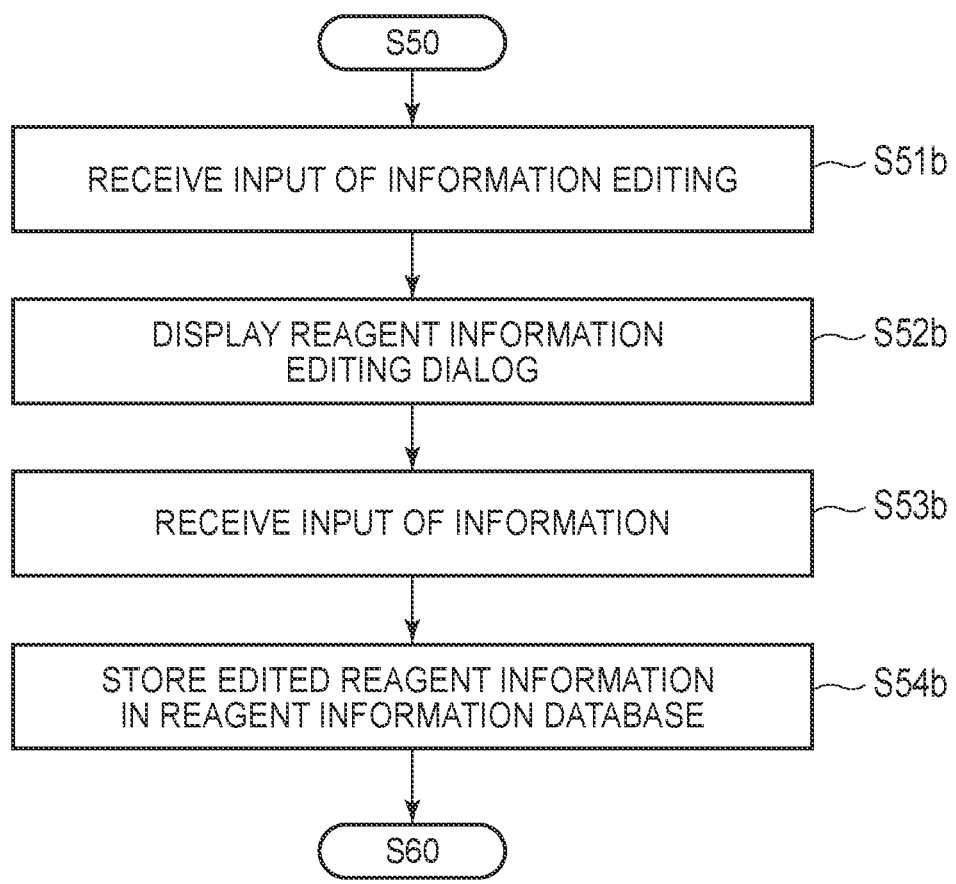
FIG. 21 is a flow diagram illustrating another example of a predetermined operation in a display method according to an embodiment; in this diagram, collective editing of reagent information is adopted as the predetermined operation.
Figure 23:
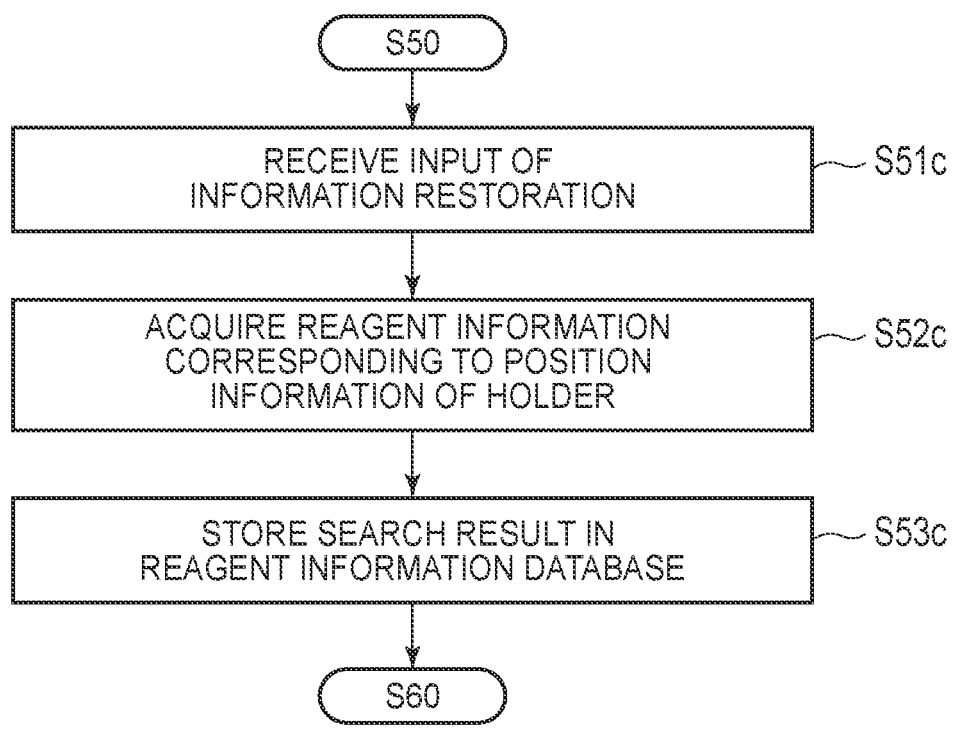
FIG. 23 is a flow diagram illustrating still another example of a predetermined operation in a display method according to an embodiment; in this diagram, restoration of reagent information is adopted as the predetermined operation.
Figure 24:
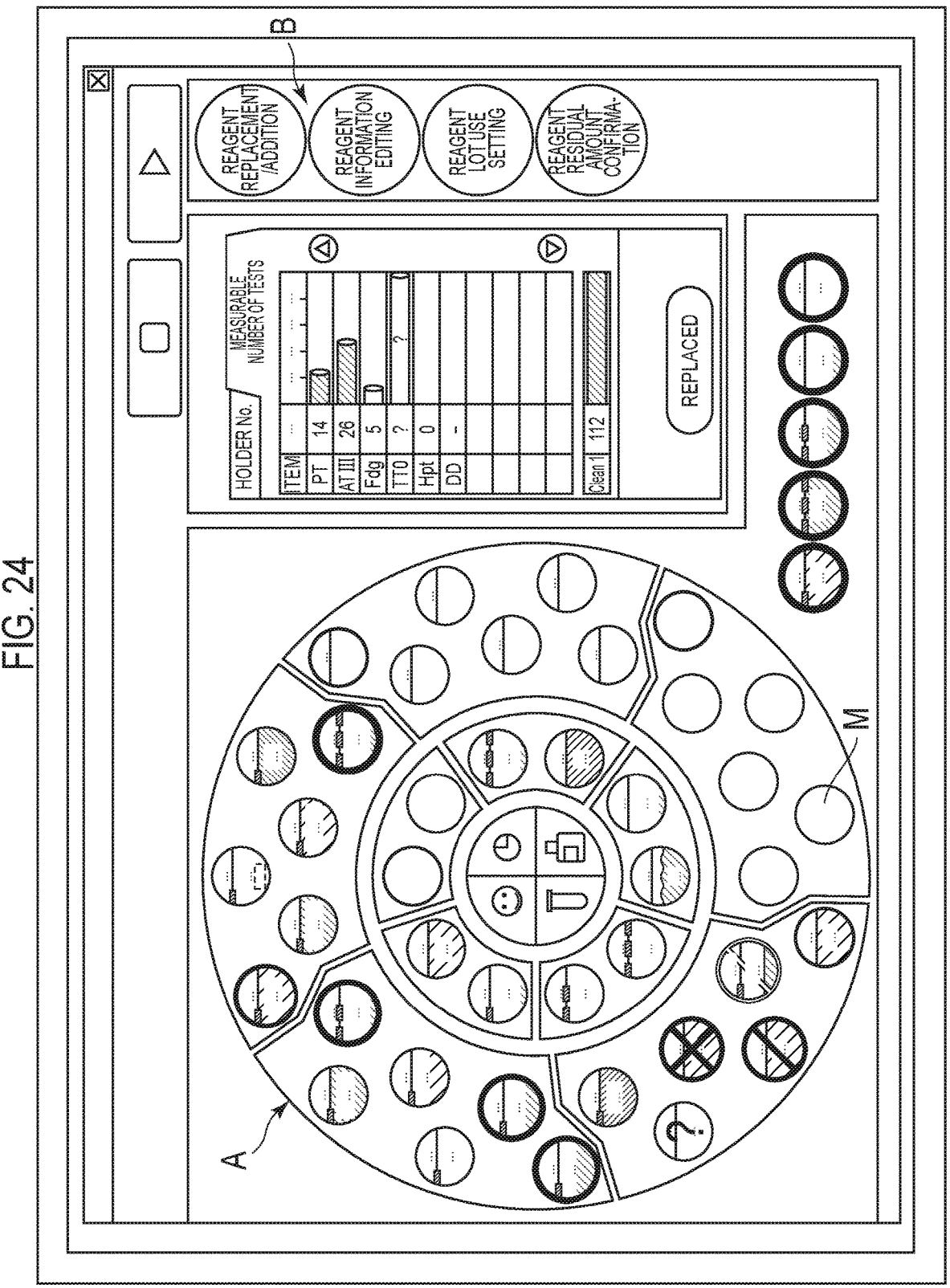
FIG. 24 is a diagram illustrating a display screen for reagent monitor information in related art.

A sequence of processing at the time when, after the icons 700 are selected, residual reagent information of reagents represented by the icons 700 are collectively edited is explained with reference to FIG. 21.

In S51b, input of information editing is received. In this step, tap of a button of "information editing" in the operation instruction region 650 by the operator is set as a trigger.

Figure 22:
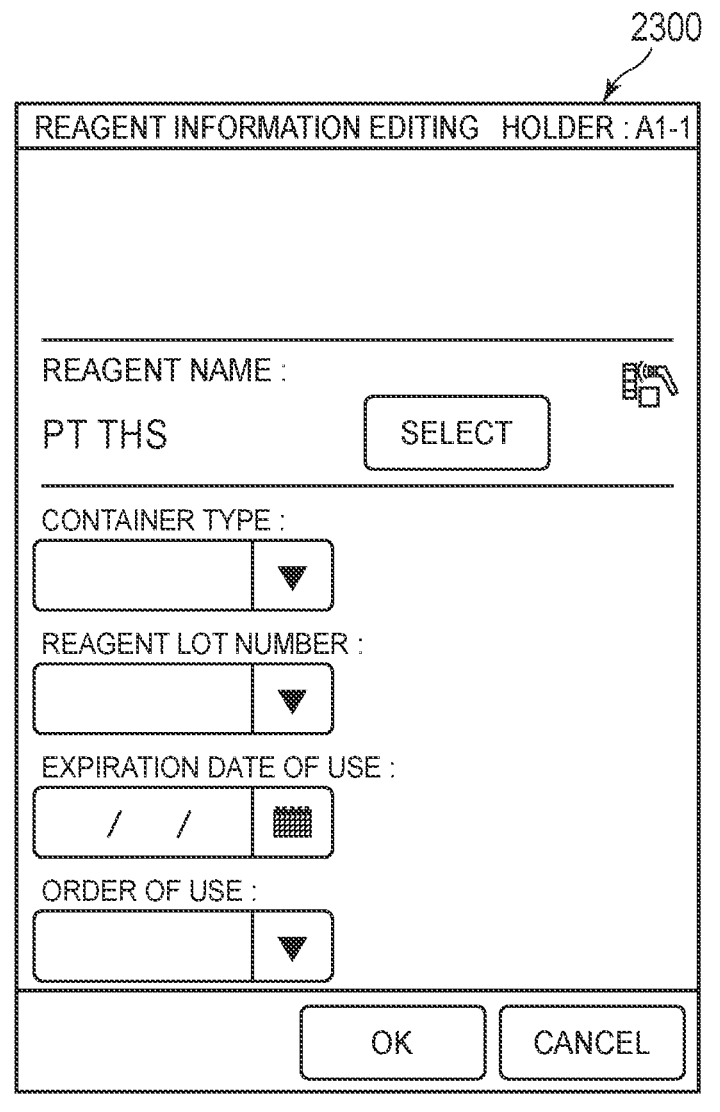

In S52b, the display controller 51 causes the display unit 33c to display a reagent information editing region 2300. The reagent information editing region 2300 is, for example, a popup screen illustrated in FIG. 22. In FIG. 22, information on a reagent name "PT THS" is read from the barcode A of the reagent container 442. However, a type of a container, a lot number of a reagent, an expiration date of use, order of use, and the like are not set.

In S53b, input of information is received. At this time, the operator inputs reagent information as appropriate via the input unit 33d.

In S54b, the analysis controller 33a stores edited reagent information in the reagent information database 36. Consequently, reagent information of the reagents represented by the selected icons 700 are updated.

Example 3: Restoration of Reagent Information

Example 3 is an example in which reagent information of reagents represented by selected icons 700 is restored. According to the categories illustrated in FIG. 9, this operation is executable on icons including reagent information of the "barcode reading error (with previous reagent information)". For example, such operation can be performed when a barcode reading error occurs before the sample analyzer 30 is used this time although the reagent container 442 is left arranged in the holder 441 after the sample analyzer 30 was used last time.

A sequence of processing at the time when, after icons 700 are selected, reagent information of the icons 700 is restored is explained.

In S51c, input of information restoration is received. In this step, tap of a button of "information restoration" in the operation instruction region 650 by the operator is set as a trigger.

In S52c, the analysis controller 33a searches through the reagent information database 36 and acquires necessary reagent information. Specifically, the analysis controller 33a refers to holder numbers of the holders 441 associated with the selected icons 700. Subsequently, the analysis controller 33a acquires, from the reagent information database 36, reagent information associated with the holder numbers. As a result, reagents arranged in the positions of the holders 441 associated with the selected icons 700 until the last time of use are extracted.

In S53c, the analysis controller 33a stores the reagent information acquired in S52c in the reagent information database 36. Consequently, the reagent information database 36 is updated.

The invention includes other embodiments in addition to the above-described embodiments without departing from the spirit of the invention. Embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A display method in a sample analyzer comprising holders configured to hold reagent containers of reagents used for an analysis of a sample, reagent information being provided on each of the reagent containers, the display method comprising:
   displaying, on a display unit, icons respectively associated with the holders;
   receiving a single selection operation of a plurality of icons relating to each other from among the icons displayed on the display unit, the plurality of icons relating to each other related based on sharing a same category of reagent information of the reagents, wherein the single selection operation is a single operation of selecting only one of the plurality of icons relating to each other, and by only selecting the one of the plurality of icons relating to each other, all of the plurality of icons relating to each other are selected by the single selection operation, wherein the icons relating to each other are icons whose corresponding holders hold:
   (1) a first category of reagent containers in which reagent information has not been read from the reagent containers held on the corresponding holders and the reagent information is not registered in a reagent information database;
   (2) a second category of reagent containers in which reagent information has not been read from the reagent containers held on the corresponding holders and the reagent information is registered in the reagent information database;
   (3) a third category of reagent containers in which reagent information has been read from the reagent containers held on the corresponding holders and a part of the reagent information is not registered in the reagent information database; or
   (4) a fourth category of reagent containers in which reagent information has been read from the reagent containers held on the corresponding holders and the reagent information has been acquired from the reagent information database; and receiving an instruction for a predetermined operation commonly relevant to the plurality of icons relating to each other for which the single selection operation has been received and relevant to the category of reagent information, wherein the predetermined operation comprises:
  (i) measuring residual amounts of the reagent and storing the residual amount of the reagent in the reagent information database for the fourth category of reagent containers;
  (ii) editing reagent information on the reagent and storing the edited reagent information in the reagent information database for the first, second or third category of reagent containers;
  (iii) restoring reagent information on the reagent in the reagent information database for the second category of reagent containers; or
  (iv) resetting residual amounts of the reagent for the fourth category of reagent containers.

2. The display method according to claim 1, wherein
the reagent information is associated with each of the reagents, and
the icons displayed on the display unit have forms depending on the respective reagent information.

3. The display method according to claim 2, wherein the plurality of icons relating to each other are displayed in a same form.

4. The display method according to claim 3, wherein the same form indicates that the predetermined operation is the same among the plurality of icons relating to each other.

5. The display method according to claim 1, wherein the plurality of icons relating to each other are associated with holders holding reagent containers whose reagent information has failed to be read from a code attached to the reagent containers, and the predetermined operation comprises:
  (i) editing reagent information on the reagent, or
  (ii) restoring reagent information on the reagent.

6. The display method according to claim 5, wherein
the plurality of icons relating to each other are associated with the holders holding the reagent containers whose reagent information has failed to be read from the code attached to the reagent containers and whose previous reagent information is not registered in a reagent information database; and
the predetermined operation comprises:
(i) editing reagent information on the reagent.

7. The display method according to claim 6, further comprising
storing the edited reagent information in the reagent information database as reagent information of the reagent.

8. The display method according to claim 7, wherein
the plurality of icons relating to each other are associated with the holders holding the reagent containers whose reagent information has failed to be read from the code attached to the reagent container and whose previous reagent information is registered in the reagent information database; and
the predetermined operation comprises:
(iii) restoring reagent information on the reagent.

9. The display method according to claim 8, further comprising
storing the previous reagent information in the reagent information database as reagent information of the reagent.

10. The display method according to claim 1, wherein an arrangement of the plurality of icons on the display unit corresponds to an arrangement of the holders holding the reagent containers.

11. The display method according to claim 1, wherein the single selection operation comprises a single tapping operation on the display unit.

12. The display method according to claim 1, wherein
the plurality of icons relating to each other are associated with holders holding reagent containers whose previous reagent information is not registered in a reagent information database; and
the predetermined operation comprises:
(ii) editing reagent information on the reagent.

13. The display method according to claim 12, further comprising
storing the edited reagent information in the reagent information database as reagent information of the reagent.

14. The display method according to claim 1, wherein
the plurality of icons relating to each other are associated with holders holding reagent containers whose remaining amount of reagent is unknown; and
the predetermined operation comprises:
(i) measuring residual amounts of the reagent, or
(iv) resetting residual amounts of the reagent.

15. The display method according to claim 1, further comprising
changing a first mode in which the single selection operation is not receivable to a second mode in which the single selection operation is receivable.

16. The display method according to claim 15, wherein the first mode is changed to the second mode by a long press of the one of the plurality of icons relating to each other on the display.

17. The display method according to claim 15, wherein the first mode is changed to the second mode by a check of a mode switching section on the display.

18. The display method according to claim 1, wherein the single selection operation comprises a single tapping operation on the display unit.

19. The display method according to claim 1, wherein the plurality of icons relating to each other are associated with holders holding reagent containers whose reagent names are the same each other.

20. A sample analyzer comprising:
holders configured to hold reagent containers of reagents used for an analysis of a sample, reagent information being provided on each of the reagent containers;
a display unit;
an input unit; and
a processor configured with a program to perform operations comprising operation as a controller configured to:
  display, on the display unit, icons respectively associated with the holders;
  receive a single selection operation of a plurality of icons relating to each other from among the icons displayed on the display unit, the plurality of icons relating to each other related based on sharing a same category of reagent information of the reagents, wherein the single selection operation is a single operation of selecting only one of the plurality of icons relating to each other, and by only selecting the one of the plurality of icons relating to each other, all of the plurality of icons relating to each other are selected by the single selection operation, wherein the icons relating to each other are icons whose corresponding holders hold:
(1) a first category of reagent containers in which reagent information has not been read from the reagent containers held on the corresponding holders and the reagent information is not registered in a reagent information database;
(2) a second category of reagent containers in which reagent information has not been read from the reagent containers held on the corresponding holders and the reagent information is registered in the reagent information database;
(3) a third category of reagent containers in which reagent information has been read from the reagent containers held on the corresponding holders and a part of the reagent information is not registered in the reagent information database; or
(4) a fourth category of reagent containers in which reagent information has been read from the reagent containers held on the corresponding holders and the reagent information has been acquired from the reagent information database; and receive, through the input unit, an instruction for a predetermined operation commonly relevant to the plurality of icons relating to each other for which the single selection operation has been received and relevant to the category of reagent information, wherein the predetermined operation comprises:
(i) measuring residual amounts of the reagent and storing the residual amount of the reagent in the reagent information database for the fourth category of reagent containers;
(ii) editing reagent information on the reagent and storing the edited reagent information in the reagent information database for the first, second or third category of reagent containers;
(iii) restoring reagent information on the reagent in the reagent information database for the second category of reagent containers; or
(iv) resetting residual amounts of the reagent for the fourth category of reagent containers.

21. A sample analyzer comprising:
holders configured to hold reagent containers of reagents used for an analysis of a sample, reagent information being provided on each of the reagent containers;
a display unit;
an input unit; and
a processor configured with a program to perform operations comprising operation as a controller configured to:
display, on the display unit, icons respectively associated with the holders;
receive, on the input unit, a single selection operation of a plurality of icons relating to each other from among the icons displayed on the display unit, the plurality of icons relating to each other related based on sharing a same category of reagent information of the reagents, wherein the single selection operation is a single operation of selecting only one of the plurality of icons relating to each other, and by only selecting the one of the plurality of icons relating to each other, all of the plurality of icons relating to each other are selected by the single selection operation, wherein the icons relating to each other are icons whose corresponding holders hold:
(1) a first category of reagent containers in which reagent information has not been read from the reagent containers held on the corresponding holders and the reagent information is not registered in a reagent information database;
(2) a second category of reagent containers in which reagent information has not been read from the reagent containers held on the corresponding holders and the reagent information is registered in the reagent information database;
(3) a third category of reagent containers in which reagent information has been read from the reagent containers held on the corresponding holders and a part of the reagent information is not registered in the reagent information database; or
(4) a fourth category of reagent containers in which reagent information has been read from the reagent containers held on the corresponding holders and the reagent information has been acquired from the reagent information database; and receive an instruction for a predetermined operation commonly relevant to the plurality of icons relating to each other for which the single selection operation has been received and relevant to the category of reagent information, wherein the predetermined operation comprises:
(i) measuring residual amounts of the reagent and storing the residual amount of the reagent in the reagent information database for the fourth category of reagent containers;
(ii) editing reagent information on the reagent and storing the edited reagent information in the reagent information database for the first, second or third category of reagent containers;
(iii) restoring reagent information on the reagent in the reagent information database for the second category of reagent containers; or
(iv) resetting residual amounts of the reagent for the fourth category of reagent containers.

22. A display method in a sample analyzer comprising holders configured to hold reagent containers of reagents used for an analysis of a sample, reagent information being provided on each of the reagent containers, the display method comprising:
displaying, on a display unit, icons respectively associated with the holders;
receiving a single selection operation of a plurality of icons relating to each other from among the icons displayed on the display unit, the plurality of icons relating to each other related based on sharing a same category of reagent information of the reagents, wherein the single selection operation is a single operation of selecting only one of the plurality of icons relating to each other;
changing, on the display unit, display forms of the icons displayed on the display unit so that the plurality of icons relating to each other are distinguishably displayed among the icons displayed on the display unit;
based on receiving the single selection operation of only selecting the one of the plurality of icons relating to each other, receiving selection operations of each of the plurality of icons relating to each other excepting the one of the plurality of icons relating to each other for which the single selection operation has been received, such that all of the plurality of icons relating to each other are selected by the single selection operation, wherein the icons relating to each other are icons whose corresponding holders hold:
(1) a first category of reagent containers in which reagent information has not been read from the reagent containers held on the corresponding holders and the reagent information is not registered in a reagent information database;
(2) a second category of reagent containers in which reagent information has not been read from the reagent containers held on the corresponding holders and the reagent information is registered in the reagent information database;
(3) a third category of reagent containers in which reagent information has been read from the reagent containers held on the corresponding holders and a part of the reagent information is not registered in the reagent information database; or
(4) a fourth category of reagent containers in which reagent information has been read from the reagent containers held on the corresponding holders and the reagent information has been acquired from the reagent information database; and receiving an instruction for a predetermined operation commonly relevant to the plurality of icons relating to each other for which the single selection operation has been received and relevant to the category of reagent information, wherein the predetermined operation comprises:
(i) measuring residual amounts of the reagent and storing the residual amount of the reagent in the reagent information database for the fourth category of reagent containers;
(ii) editing reagent information on the reagent and storing the edited reagent information in the reagent information database for the first, second or third category of reagent containers;
(iii) restoring reagent information on the reagent in the reagent information database for the second category of reagent containers: or
(iv) resetting residual amounts of the reagent for the fourth category of reagent containers.

23. The display method according to claim 22, wherein the changing of the display forms comprises changing colors of the icons displayed on the display unit.

24. A sample analyzer comprising:
holders configured to hold reagent containers of reagents used for an analysis of a sample, reagent information being provided on each of the reagent containers;
a display unit;
an input unit; and
a processor configured with a program to perform operations comprising operation as a controller configured to:
display, on a display unit, icons respectively associated with the holders;
receive a single selection operation of a plurality of icons relating to each other from among the icons displayed on the display unit, the plurality of icons relating to each other related based on sharing a same category of reagent information of the reagents,
wherein the single selection operation is a single operation of selecting only one of the plurality of icons relating to each other;
change, on the display unit, display forms of the icons displayed on the display unit so that the plurality of icons relating to each other are distinguishably displayed among the icons displayed on the display unit;
based on receiving the single selection operation of only selecting the one of the plurality of icons relating to each other, receive selection operations of each of the plurality of icons relating to each other excepting the one of the plurality of icons relating to each other for which the single selection operation has been received, such that all of the plurality of icons relating to each other are selected by the single selection operation, wherein the icons relating to each other are icons whose corresponding holders hold:
(1) a first category of reagent containers in which reagent information has not been read from the reagent containers held on the corresponding holders and the reagent information is not registered in a reagent information database;
(2) a second category of reagent containers in which reagent information has not been read from the reagent containers held on the corresponding holders and the reagent information is registered in the reagent information database;
(3) a third category of reagent containers in which reagent information has been read from the reagent containers held on the corresponding holders and a part of the reagent information is not registered in the reagent information database; or
(4) a fourth category of reagent containers in which reagent information has been read from the reagent containers held on the corresponding holders and the reagent information has been acquired from the reagent information database; and
receive an instruction for a predetermined operation commonly relevant to the plurality of icons relating to each other for which the single selection operation has been received and relevant to the category of reagent information, wherein the predetermined operation comprises:
(i) measuring residual amounts of the reagent and storing the residual amount of the reagent in the reagent information database for the fourth category of reagent containers;
(ii) editing reagent information on the reagent and storing the edited reagent information in the reagent information database for the first. second or third category of reagent containers;
(iii) restoring reagent information on the reagent in the reagent information database for the second category of reagent containers; or
(iv) resetting residual amounts of the reagent for the fourth category of reagent containers.

* * * * *